(12) United States Patent
Lee

(10) Patent No.: US 10,534,705 B2
(45) Date of Patent: Jan. 14, 2020

(54) MEMORY SYSTEM FOR SCHEDULING FOREGROUND AND BACKGROUND OPERATIONS, AND OPERATING METHOD THEREOF

(71) Applicant: SK hynix Inc., Gyeonggi-do (KR)

(72) Inventor: Jong-Min Lee, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 3 days.

(21) Appl. No.: 15/911,570

(22) Filed: Mar. 5, 2018

(65) Prior Publication Data

US 2019/0073295 A1 Mar. 7, 2019

(30) Foreign Application Priority Data

Sep. 4, 2017 (KR) .................. 10-2017-0112711

(51) Int. Cl.
| | | |
|---|---|---|
| *G06F 12/00* | (2006.01) | |
| *G06F 13/00* | (2006.01) | |
| *G06F 12/02* | (2006.01) | |
| *G06F 3/06* | (2006.01) | |
| *G06F 9/48* | (2006.01) | |
| *G06F 9/50* | (2006.01) | |

(52) U.S. Cl.
CPC .......... *G06F 12/0246* (2013.01); *G06F 3/064* (2013.01); *G06F 3/0616* (2013.01); *G06F 3/0652* (2013.01); *G06F 3/0659* (2013.01); *G06F 3/0679* (2013.01); *G06F 9/4881* (2013.01); *G06F 9/5016* (2013.01); *G06F 12/0253* (2013.01)

(58) Field of Classification Search
CPC .... G06F 12/0246; G06F 3/064; G06F 3/0679; G06F 9/4881; G06F 9/5016
See application file for complete search history.

(56) References Cited

U.S. PATENT DOCUMENTS

| | | | |
|---|---|---|---|
| 2012/0137302 A1* | 5/2012 | Tsuchida | ............... G06F 9/4881 718/103 |
| 2016/0092272 A1* | 3/2016 | Karaje | .................. G06F 9/5011 718/104 |
| 2017/0249213 A1* | 8/2017 | Slik | ..................... G06F 11/1092 |
| 2018/0011527 A1* | 1/2018 | Kim | ...................... G06F 3/0614 |
| 2018/0321972 A1* | 11/2018 | Lin | ............................ G06F 9/48 |

(Continued)

FOREIGN PATENT DOCUMENTS

| | | |
|---|---|---|
| KR | 1020160078611 | 7/2016 |
| KR | 1020160110596 | 9/2016 |
| KR | 1020160113580 | 9/2016 |

*Primary Examiner* — Sean D Rossiter
(74) *Attorney, Agent, or Firm* — IP & T Group LLP

(57) ABSTRACT

A memory system includes: a memory device that includes a plurality of memory blocks each of which includes a plurality of pages for storing data; and a controller that includes a first memory, wherein the controller performs a foreground operation and a background operation onto the memory blocks, checks priorities and weights for the foreground operation and the background operation, schedules queues corresponding to the foreground operation and the background operation based on the priorities and the weights, allocates regions corresponding to the scheduled queues to the first memory, and performs the foreground operation and the background operation through the regions allocated to the first memory.

20 Claims, 13 Drawing Sheets

(56) References Cited

U.S. PATENT DOCUMENTS

2019/0042314 A1\* 2/2019 Verrall .................. G06F 9/5038
2019/0102227 A1\* 4/2019 Ananthakrishnan ......................... G06F 9/5038

\* cited by examiner

MEMORY SYSTEM FOR SCHEDULING FOREGROUND AND BACKGROUND OPERATIONS, AND OPERATING METHOD THEREOF

CROSS-REFERENCE TO RELATED APPLICATIONS

The present application claims priority of Korean Patent Application No. 10-2017-0112711, filed on Sep. 4, 2017, which is incorporated herein by reference in its entirety.

BACKGROUND

1. Field

Exemplary embodiments of the present invention relate to a memory system, and more particularly, to a memory system capable of processing data by using a memory device, and a method for operating the memory system.

2. Description of the Related Art

The computer environment paradigm has changed to ubiquitous computing systems that can be used anytime and anywhere. Due to this fact, use of portable electronic devices such as mobile phones, digital cameras, and notebook computers has rapidly increased. These portable electronic devices typically employ a memory system having one or more memory devices for storing data. A memory system may be used as a main memory device or an auxiliary memory device of a portable electronic device.

Memory systems provide excellent stability, durability, high information access speed, and low power consumption since they have no moving parts. Examples of memory systems having such advantages include universal serial bus (USB) memory devices, memory cards having various interfaces, and solid-state drives (SSD).

SUMMARY

Embodiments of the present invention are directed to a memory system capable of processing data with a memory device rapidly and stably by minimizing the complexity and performance deterioration of the memory system and maximizing the utility efficiency of the memory device, and a method for operating the memory system.

In accordance with an embodiment of the present invention, a memory system includes: a memory device that includes a plurality of memory blocks each of which includes a plurality of pages for storing data; and a controller that includes a first memory, wherein the controller performs a foreground operation and a background operation onto the memory blocks, checks priorities and weights for the foreground operation and the background operation, schedules queues corresponding to the foreground operation and the background operation based on the priorities and the weights, allocates regions corresponding to the scheduled queues to the first memory, and performs the foreground operation and the background operation through the regions allocated to the first memory.

The priorities may be decided based on at least one between importance and reliability of the foreground operation and the background operation and importance and reliability of data corresponding to the foreground operation and the background operation.

The weights may include a basic weight, a dynamic weight, and an accumulated weight.

The basic weight may include the number of frequencies and an operation rate of the foreground operation and the background operations which are performed.

The controller may decide the dynamic weight through a calculation based on the size of the data corresponding to the foreground operation and the background operation, and the basic weight or the priorities.

The controller may select first memory blocks based on parameters for the memory blocks, and decide the dynamic weight based on at least one among the number of the first memory blocks, the number of valid pages included in the first memory blocks, and the size of valid data stored in the first memory blocks.

The controller may decide the accumulated weight based on accumulation of the basic weight corresponding to performance of the foreground operation and the background operation, and normalize the dynamic weight by the accumulated weight.

The controller may schedule the queues corresponding to the foreground operation and the background operation in descending order of priorities and weights.

The controller may register the priorities and the weights in a table for each index of the queues corresponding to the foreground operation and the background operation, and check the priorities and the weights from the table.

The controller may determine fixed priorities to first queues and determine dynamic priorities to second queues among the queues corresponding to the foreground operation and the background operation, and wherein the fixed priorities may have higher priority than the dynamic priorities.

In accordance with an embodiment of the present invention, a method for operating a memory system includes: performing a foreground operation and a background operation to a memory device which includes a plurality of memory blocks each of which includes a plurality of pages for storing data; checking priorities and weights for the foreground operation and the background operation; scheduling queues corresponding to the foreground operation and the background operation based on the priorities and the weights; allocating regions corresponding to the scheduled queues to the first memory included in a controller of the memory device; and performing the foreground operation and the background operation through the regions allocated to the first memory.

The priorities may be decided based on at least one between importance and reliability of the foreground operation and the background operation and importance and reliability of data corresponding to the foreground operation and the background operation.

The weights may include a basic weight, a dynamic weight, and an accumulated weight.

The basic weight may include the number of frequencies and an operation rate of the foreground operation and the background operation which are performed.

The method may further include: deciding the dynamic weight through a calculation of the size of the data corresponding to the foreground operation and the background operation, and the basic weight or the priorities.

The deciding of the dynamic weight may include: selecting first memory blocks based on parameters for the memory blocks; and deciding the dynamic weight based on at least one among the number of the first memory blocks, the number of valid pages included in the first memory blocks, and the size of valid data stored in the first memory blocks.

The method may further include: deciding the accumulated weight based on accumulation of the basic weight corresponding to performance of the foreground operation and the background operation; and normalizing the dynamic weight by the accumulated weight.

The scheduling of the queues corresponding to the foreground operation and the background operation based on the priorities and the weights may include: scheduling the queues corresponding to the foreground operation and the background operation in descending order of priorities and weights.

The checking of the priorities and the weights for the foreground operation and the background operation may include: registering the priorities and the weights in a table for each index of the queues corresponding to the foreground operation and the background operation; and checking the priorities and the weights from the table.

The method may further include: giving fixed priorities to first queues and determining dynamic priorities to second queues among the queues corresponding to the foreground operation and the background operation, wherein the fixed priorities have higher priority than the dynamic priorities.

In accordance with an embodiment of the present invention, a memory system includes a memory device; and a controller suitable for controlling the memory device to perform foreground operations and background operations according to one or more of priorities and weights respectively determined for the foreground and background operations, wherein the controller schedules the foreground and background operations in queues included therein according to one or more of the priorities and weights.

DETAILED DESCRIPTION

Figure 1:
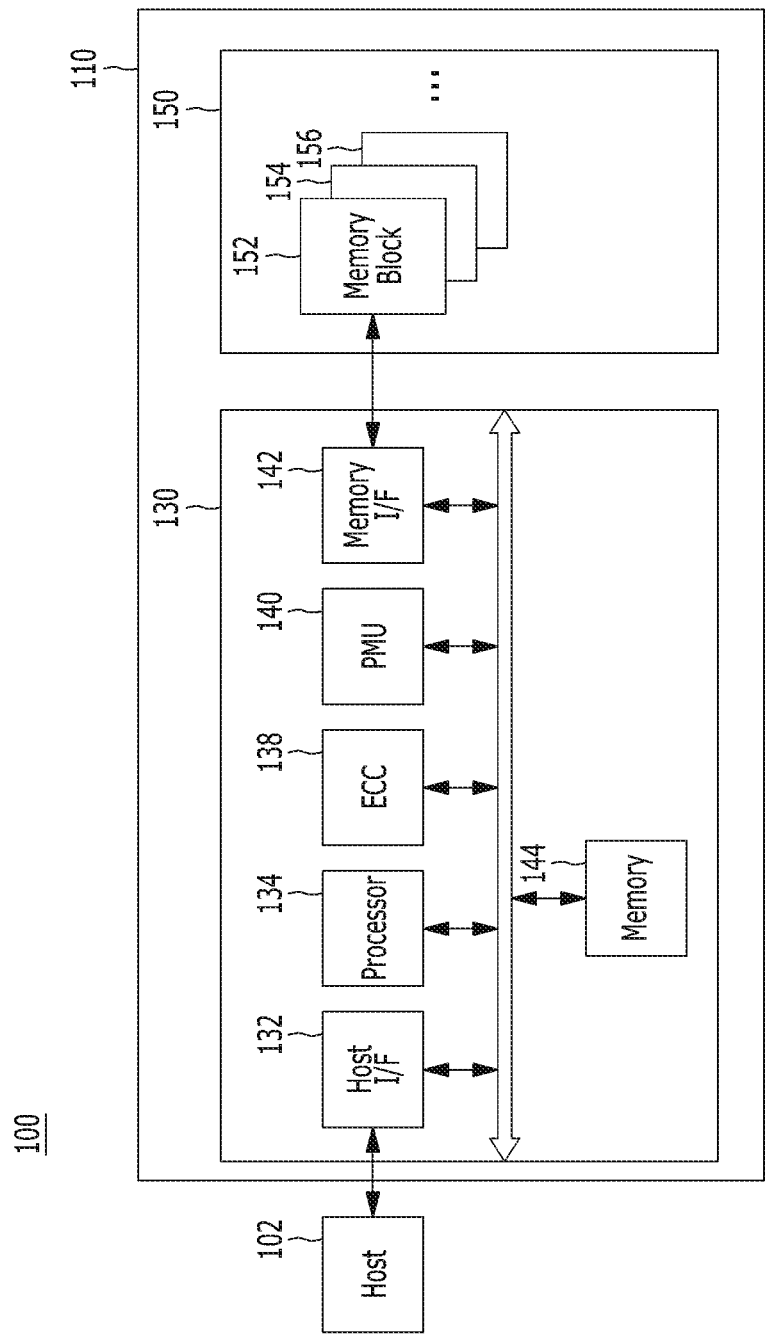
FIG. 1 is a block diagram illustrating a data processing system in accordance with an embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The drawings are not necessarily to scale and in some instances, proportions may have been exaggerated in order to clearly illustrate features of the embodiments. When a first layer is referred to as being "on" a second layer or "on" a substrate, it not only refers to a case where the first layer is formed directly on the second layer or the substrate but also a case where a third layer exists between the first layer and the second layer or the substrate.

FIG. 1 is a block diagram illustrating a data processing system 100 in accordance with an embodiment of the present invention.

Referring to FIG. 1, the data processing system 100 may include a host 102 operatively coupled to a memory system 110.

The host 102 may include portable electronic devices such as a mobile phone, MP3 player and laptop computer or non-portable electronic devices such as a desktop computer, game machine, TV and projector.

The host 102 may include at least one OS (operating system), and the OS may manage and control overall functions and operations of the host 102, and provide an operation between the host 102 and a user using the data processing system 100 or the memory system 110. The OS may support functions and operations corresponding to the use, purpose and usage of a user. For example, the OS may be divided into a general OS and a mobile OS, depending on the mobility of the host 102. The general OS may be divided into a personal OS and an enterprise OS, depending on the environment of a user. For example, the personal OS configured to support a function of providing a service to general users may include Windows and Chrome, and the enterprise OS configured to secure and support high performance may include Windows server, Linux and Unix. Furthermore, the mobile OS configured to support a function of providing a mobile service to users and a power saving function of a system may include Android, iOS and Windows Mobile. At this time, the host 102 may include a plurality of OSs, and execute an OS to perform an operation corresponding to a user's request on the memory system 110.

The memory system 110 may operate to store data for the host 102 in response to a request of the host 102. Non-limited examples of the memory system 110 may include a solid-state drive (SSD), a multi-media card (MMC), a secure digital (SD) card, a universal storage bus (USB) device, a universal flash storage (UFS) device, compact flash (CF) card, a smart media card (SMC), a personal computer memory card international association (PCMCIA) card and memory stick. The MMC may include an embedded MMC (eMMC), reduced size MMC (RS-MMC) and micro-MMC, and the like. The SD card may include a mini-SD card and micro-SD card.

The memory system 110 may be embodied by various types of storage devices. Non-limited examples of storage devices included in the memory system 110 may include volatile memory devices such as a DRAM dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM) and a flash memory. The flash memory may have a 3-dimensional (3D) stack structure.

The memory system 110 may include a memory device 150 and a controller 130. The memory device 150 may store data for the host 102, and the controller 130 may control data storage into the memory device 150.

The controller 130 and the memory device 150 may be integrated into a single semiconductor device, which may be included in the various types of memory systems as exemplified above. For example, the controller 130 and the memory device 150 may be integrated as one semiconductor device to constitute an SSD. When the memory system 110 is used as an SSD, the operating speed of the host 102 connected to the memory system 110 can be improved. In addition, the controller 130 and the memory device 150 may be integrated as one semiconductor device to constitute a memory card. For example, the controller 130 and the memory device 150 may constitute a memory card such as a PCMCIA (personal computer memory card international association) card, CF card, SMC (smart media card), memory stick, MMC including RS-MMC and micro-MMC, SD card including mini-SD, micro-SD and SDHC, or UFS device.

Non-limited application examples of the memory system 110 may include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The memory device 150 may be a nonvolatile memory device and may retain data stored therein even though power is not supplied. The memory device 150 may store data provided from the host 102 through a write operation, and provide data stored therein to the host 102 through a read operation. The memory device 150 may include a plurality of memory blocks 152 to 156, each of the memory blocks 152 to 156 may include a plurality of pages, and each of the pages may include a plurality of memory cells coupled to a word line. In an embodiment, the memory device 150 may be a flash memory. The flash memory may have a 3-dimensional (3D) stack structure.

Herein, since the structure of the memory device 150 and the 3D stack structure of the memory device 150 will be described in detail later with reference to FIGS. 2 to 4 and the memory device 150 including a plurality of memory dies, the memory dies each of which includes a plurality of planes, and the planes each of which includes a plurality of memory blocks 152, 154 and 156 will be described in detail later with reference to FIG. 6, further description on them will be omitted herein.

The controller 130 may control the memory device 150 in response to a request from the host 102. For example, the controller 130 may provide data read from the memory device 150 to the host 102, and store data provided from the host 102 into the memory device 150. For this operation, the controller 130 may control read, write, program and erase operations of the memory device 150.

The controller 130 may include a host interface (I/F) unit 132, a controller processor 134, an error correction code (ECC) unit 138, a Power Management Unit (PMU) 140, a NAND flash controller (NFC) 142 and a controller memory 144 all operatively coupled via an internal bus.

The host interface unit 134 may be configured to process a command and data of the host 102, and may communicate with the host 102 through one or more of various interface protocols such as universal serial bus (USB), multi-media card (MMC), peripheral component interconnect-express (PCI-E), small computer system interface (SCSI), serial-attached SCSI (SAS), serial advanced technology attachment (SATA), parallel advanced technology attachment (PATA), enhanced small disk interface (ESDI) and integrated drive electronics (IDE).

The ECC unit 138 may detect and correct an error contained in the data read from the memory device 150. In other words, the ECC unit 138 may perform an error correction decoding process to the data read from the memory device 150 through an ECC code used during an ECC encoding process. According to a result of the error correction decoding process, the ECC unit 138 may output a signal, for example, an error correction success/fail signal. When the number of error bits is more than a threshold value of correctable error bits, the ECC unit 138 may not correct the error bits, and may output an error correction fail signal.

The ECC unit 138 may perform error correction through a coded modulation such as Low-Density Parity Check (LDPC) code, Bose-Chaudhri-Hocquenghem (BCH) code, turbo code, Reed-Solomon code, convolution code, Recursive Systematic Code (RSC), Trellis-Coded Modulation (TCM) and Block coded modulation (BCM). However, the ECC unit 138 is not limited thereto. The ECC unit 138 may include all circuits, modules, systems or devices for error correction.

The PMU 140 may provide and manage power of the controller 130.

The NFC 142 may serve as a memory/storage interface for interfacing the controller 130 and the memory device 150 such that the controller 130 controls the memory device 150 in response to a request from the host 102. When the memory device 150 is a flash memory or specifically a NAND flash memory, the NFC 142 may generate a control signal for the memory device 150 and process data to be provided to the memory device 150 under the control of the controller processor 134. The NFC 142 may work as an interface (e.g., a NAND flash interface) for processing a command and data between the controller 130 and the memory device 150. Specifically, the NFC 142 may support data transfer between the controller 130 and the memory device 150.

The controller memory 144 may serve as a working memory of the memory system 110 and the controller 130, and store data for driving the memory system 110 and the controller 130. The controller 130 may control the memory device 150 to perform read, write, program and erase operations in response to a request from the host 102. The controller 130 may provide data read from the memory device 150 to the host 102, may store data provided from the host 102 into the memory device 150. The controller memory 144 may store data required for the controller 130 and the memory device 150 to perform these operations.

The controller memory 144 may be embodied by a volatile memory. For example, the controller memory 144 may be embodied by static random access memory (SRAM) or dynamic random access memory (DRAM). The controller memory 144 may be disposed in or out of the controller 130. FIG. 1 exemplifies the controller memory 144 disposed within the controller 130. In an embodiment, the controller memory 144 may be embodied by an external volatile memory having a memory interface transferring data between the controller memory 144 and the controller 130.

The controller processor 134 may control the overall operations of the memory system 110. The controller processor 134 may drive firmware to control the overall operations of the memory system 110. The firmware may be referred to as flash translation layer (FTL). Also, the controller processor 134 may be realized as a microprocessor or a Central Processing Unit (CPU).

For example, the controller 130 may perform an operation requested by the host 102 in the memory device 150 through the controller processor 134, which is realized as a microprocessor or a CPU. In other words, the controller 130 may perform a command operation corresponding to a command received from the host 102. Herein, the controller 130 may perform a foreground operation as the command operation corresponding to the command received from the host 102. For example, the controller 130 may perform a program operation corresponding to a write command, a read operation corresponding to a read command, an erase operation corresponding to an erase command, and a parameter set operation corresponding to a set parameter command or a set feature command, as a set command.

Also, the controller 130 may perform a background operation onto the memory device 150 through the controller processor 134, which is realized as a microprocessor or a CPU. Herein, the background operation performed onto the memory device 150 may include an operation of copying and processing data stored in some memory blocks among the memory blocks 152, 154 and 156 of the memory device 150 into other memory blocks, e.g., a garbage collection (GC) operation, an operation of performing swapping between the memory blocks 152, 154 and 156 of the memory device 150 or between the data of the memory blocks 152, 154 and 156, e.g., a wear-leveling (WL) operation, an operation of storing the map data stored in the controller 130 in the memory blocks 152, 154 and 156 of the memory device 150, e.g., a map flush operation, or an operation of managing bad blocks of the memory device 150, e.g., a bad block management operation of detecting and processing bad blocks among the memory blocks 152, 154 and 156 included in the memory device 150.

Also, in the memory system in accordance with the embodiment of the present invention, for example, the controller 130 may perform a plurality of command operations corresponding to a plurality of commands received from the host 102, e.g., a plurality of program operations corresponding to a plurality of write commands, a plurality of read operations corresponding to a plurality of read commands, and a plurality of erase operations corresponding to a plurality of erase commands, in the memory device 150, and update metadata, particularly, map data, according to the performance of the command operations.

In particular, in the memory system in accordance with the embodiment of the present invention, when the controller 130 performs command operations corresponding to a plurality of commands received from the host 102, e.g., program operations, read operations, and erase operations, in the memory blocks included in the memory device 150, the operation reliability of the memory device 150 may be deteriorated and also the utility efficiency of the memory device 150 may decrease because characteristics are deteriorated in the memory blocks due to the performance of the command operations. Therefore, a copy operation or a swap operation may be performed to the memory device 150 in consideration of the parameters for the memory device 150 according to the performance of the command operations.

For example, in the memory system in accordance with the embodiment of the present invention, when the controller 130 performs program operations corresponding to a plurality of write commands received from the host 102 in the memory blocks included in the memory device 150, the controller 130 may perform a copy operation, e.g., a garbage collection operation, onto the memory device 150 in order to improve the utility efficiency of the memory device 150 included in the memory system 110.

Also, in the memory system in accordance with the embodiment of the present invention, when the controller 130 performs erase operations corresponding to a plurality of erase commands received from the host 102 in the memory blocks included in the memory device 150, each of the memory blocks included in the memory device 150 may have a limited erase count, and accordingly, the controller 130 may perform erase operations corresponding to the erase commands within range of the limited erase count. For example, when the controller 130 performs erase operations onto particular memory blocks while exceeding the limited erase count, the particular memory blocks may be processed as bad blocks, which may not be used any more. Herein, the limited erase count for the memory blocks of the memory device 150 may represent the maximum count that erase operations may be performed onto the memory blocks of the memory device 150. Therefore, in the memory system in accordance with the embodiment of the present invention, erase operations may be performed uniformly within the range of the limited erase count for the memory blocks of the memory device 150. Also, in order to secure operation reliability for the memory blocks of the memory device 150 from the erase operations, data may be processed with the memory blocks of the memory device 150 in consideration of the parameters of the memory blocks of the memory device 150, for example, a swap operation, e.g., a wear-leveling operation, may be performed to the memory device 150.

Also, in the memory system in accordance with the embodiment of the present invention, when the controller 130 performs read operations corresponding to a plurality of read commands received from the host 102 in the memory blocks included in the memory device 150, particularly, when the controller 130 repeatedly performs read operations in some particular memory blocks, read disturbance may be caused in the particular memory blocks due to the repeated read operations. Therefore, the controller 130 may perform a read reclaim operation to protect the particular memory blocks from losing data due to the read disturbance. In other words, in the memory system in accordance with the embodiment of the present invention, the controller 130 may copy and store the data stored in the particular memory blocks into other memory blocks through the read reclaim operation. In short, the controller 130 may perform a copy operation for the particular memory blocks in the memory device 150.

Herein, in the memory system in accordance with the embodiment of the present invention, the controller 130 may perform not only a swap operation and a copy operation but also a bad block management operation for some memory blocks in consideration of the parameters according to the performance of command operations corresponding to the commands received from the host 102, e.g., valid page counts (VPC) of the memory blocks of the memory device 150 according to the performance of program operations, erase counts according to the performance of erase operations, program counts according to the performance of program operations, and read counts according to the performance of read operations. Also, in the memory system in accordance with the embodiment of the present invention, the controller 130 may perform a copy operation, e.g., a garbage collection operation, onto the memory blocks of the memory device 150 in consideration of the parameters corresponding to not only the swap operation and the copy operation but also the bad block management operation that are performed to the memory blocks of the memory device 150. Herein, in the memory system in accordance with the embodiment of the present invention, since the performance of the command operations corresponding to a plurality of commands received from the host 102 and the performance of the swap operation and the copy operation performed to the memory device 150 in consideration of the parameters corresponding to the performance of the command operations will be described in detail later with reference to FIGS. 5 to 9, further description of it will be omitted herein.

The processor 134 of the controller 130 may include a management unit (not illustrated) for performing a bad management operation of the memory device 150. The management unit may perform a bad block management operation of checking a bad block, in which a program fail occurs due to a characteristic of the memory device, for example, a NAND flash memory during a program operation, among the plurality of memory blocks 152 to 156 included in the memory device 150. The management unit may write the program-failed data of the bad block to a new memory block. In a memory device 150 having a 3D stack structure, the bad block management operation may reduce the use efficiency of the memory device 150 and the reliability of the memory system 110. Thus, the bad block management operation needs to be performed with more reliability. Hereafter, the memory device of the memory system in accordance with the embodiment of the present invention is described in detail with reference to FIGS. 2 to 4.

Figure 2:
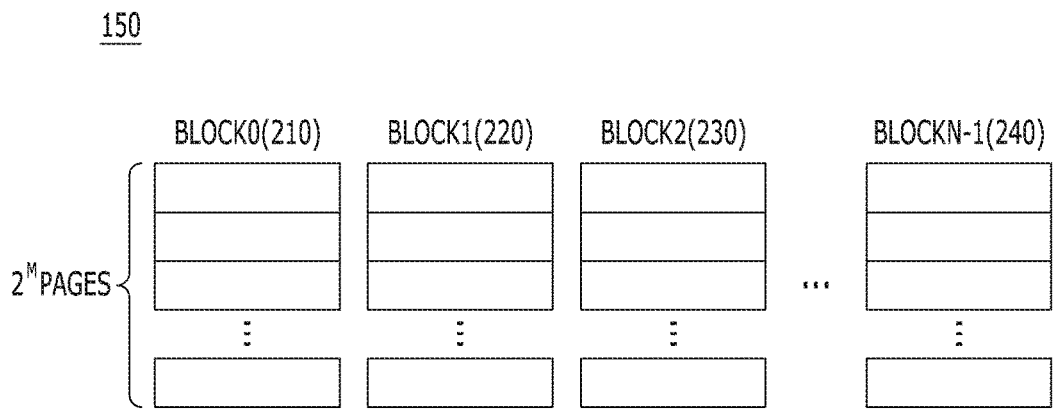
FIG. 2 is a schematic diagram illustrating an exemplary configuration of a memory device employed in a memory system shown in FIG. 1.
Figure 3:
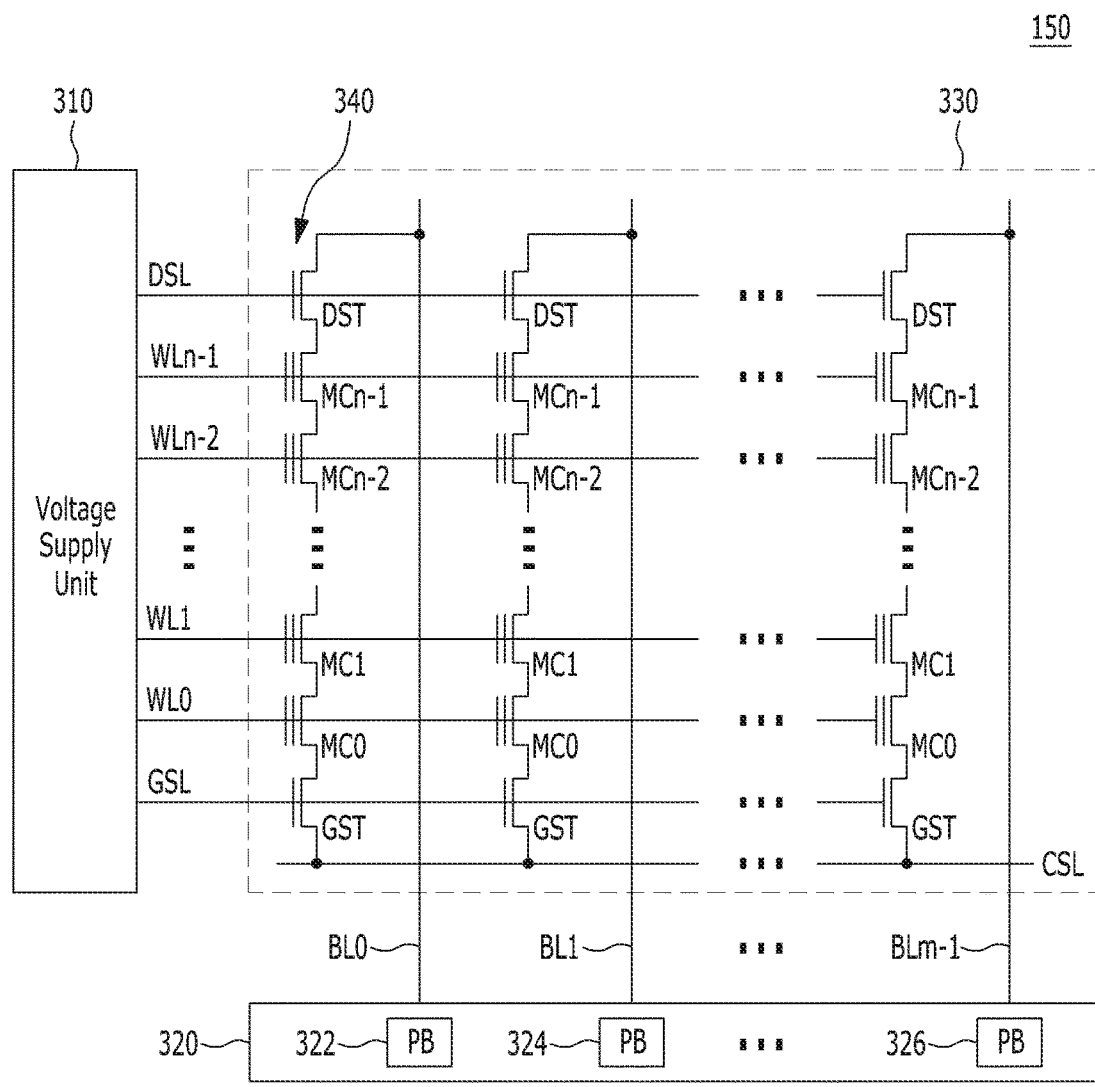
FIG. 3 is a circuit diagram illustrating an exemplary configuration of a memory cell array of a memory block in a memory device shown in FIG. 1.
Figure 4:
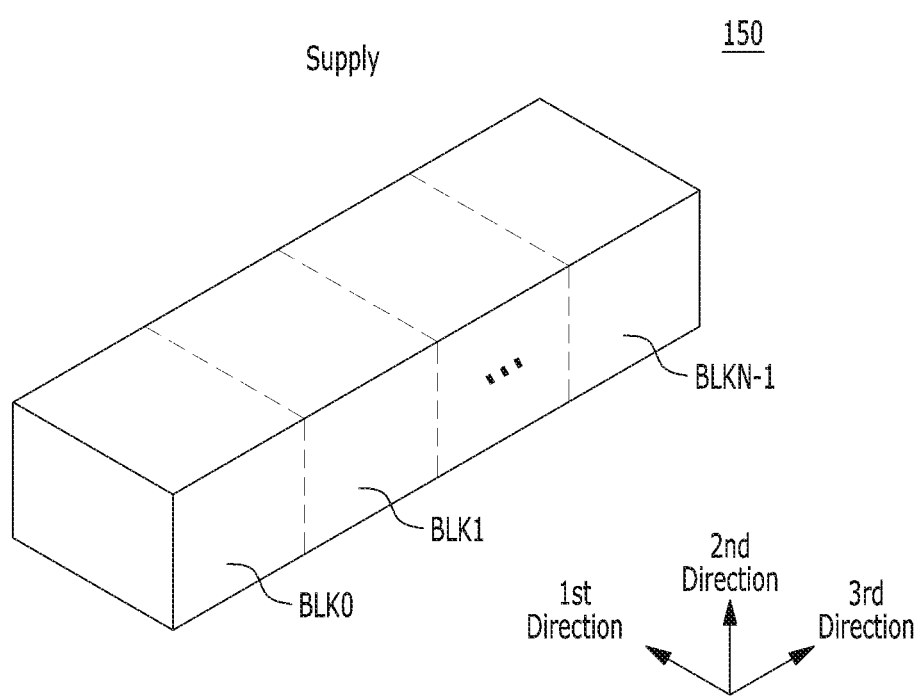
FIG. 4 is a block diagram illustrating a data processing system in accordance with an embodiment of the present invention.

FIG. 2 is a schematic diagram illustrating the memory device 150, FIG. 3 is a circuit diagram illustrating an exemplary configuration of a memory cell array of a memory block in the memory device 150 and FIG. 4 is a schematic diagram illustrating an exemplary 3D structure of the memory device 150.

Referring to FIG. 2, the memory device 150 may include a plurality of memory blocks 0 to N−1, e.g., a memory block 0 BLK0 210, a memory block 1 BLK1 220, a memory block 2 BLK2 230, and a memory block N−1 BLKN−1 240, and each of the memory blocks 210, 220, 230 and 240 may include a plurality of pages, for example, $2^M$ pages, the number of which may vary according to circuit design. Herein, although it is described for the sake of convenience in description that each of the memory blocks include $2^M$ pages, each of the memory blocks may include M pages as well. Each of the pages may include a plurality of memory cells that are coupled to a plurality of word lines WL.

Also, the memory device 150 may include a plurality of memory blocks, which may include a single level cell (SLC) memory block storing 1-bit data and/or a multi-level cell (MLC) memory block storing 2-bit data. Herein, the SLC memory blocks may include a plurality of pages that are realized by memory cells storing one-bit data in one memory cell. The SLC memory blocks may have a quick data operation performance and high durability. On the other hand, the MLC memory blocks may include a plurality of pages that are realized by memory cells storing multi-bit data, e.g., data of two or more bits, in one memory cell. The MLC memory blocks may have a greater data storing space than the SLC memory blocks. In other words, the MLC memory blocks may be highly integrated. Particularly, the memory device 150 may include not only the MLC memory blocks each of which includes a plurality of pages that are realized by memory cells capable of storing two-bit data in one memory cell, but also triple level cell (TLC) memory blocks each of which includes a plurality of pages that are realized by memory cells capable of storing three-bit data in one memory cell, quadruple level cell (QLC) memory blocks each of which includes a plurality of pages that are realized by memory cells capable of storing four-bit data in one memory cell, and/or multiple level cell memory blocks each of which includes a plurality of pages that are realized by memory cells capable of storing five or more-bit data in one memory cell, and so forth.

Herein, in accordance with the embodiment of the present invention, although it is described for the sake of convenience in description that the memory device 150 is a non-volatile memory, such as a flash memory, e.g., a NAND flash memory, the memory device 150 may be realized as one memory among a Phase Change Random Access Memory (PCRAM), a Resistive Random Access Memory (RRAM or ReRAM), a Ferroelectric Random Access Memory (FRAM), a Spin Transfer Torque Magnetic Random Access Memory (SU-RAM or STT-M RAM).

The memory blocks 210, 220, 230 and 240 may store the data transferred from the host 102 through a program operation, and transfer data stored therein to the host 102 through a read operation.

Subsequently, referring to FIG. 3, a memory block 330 which may correspond to any of the plurality of memory blocks 152 to 156 included in the memory device 150 of the memory system 110 may include a plurality of cell strings 340 coupled to a plurality of corresponding bit lines BL0 to BLm−1. The cell string 340 of each column may include one or more drain select transistors DST and one or more source select transistors SST. Between the drain and select transistors DST and SST, a plurality of memory cells MC0 to MCn−1 may be coupled in series. In an embodiment, each of the memory cell transistors MC0 to MCn−1 may be embodied by an MLC capable of storing data information of a plurality of bits. Each of the cell strings 340 may be electrically coupled to a corresponding bit line among the plurality of bit lines BL0 to BLm−1. For example, as illustrated in FIG. 3, the first cell string is coupled to the first bit line BL0, and the last cell string is coupled to the last bit line BLm−1.

Although FIG. 3 illustrates NAND flash memory cells, the invention is not limited in this way. It is noted that the memory cells may be NOR flash memory cells, or hybrid flash memory cells including two or more types of memory cells combined therein. Also, it is noted that the memory device 150 may be a flash memory device including a conductive floating gate as a charge storage layer or a charge trap flash (CTF) memory device including an insulation layer as a charge storage layer.

The memory device 150 may further include a voltage supply unit 310 which provides word line voltages including a program voltage, a read voltage and a pass voltage to supply to the word lines according to an operation mode. The voltage generation operation of the voltage supply unit 310 may be controlled by a control circuit (not illustrated).

Under the control of the control circuit, the voltage supply unit 310 may select one of the memory blocks (or sectors) of the memory cell array, select one of the word lines of the selected memory block, and provide the word line voltages to the selected word line and the unselected word lines as may be needed.

The memory device 150 may include a read/write circuit 320 which is controlled by the control circuit. During a verification/normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer (not illustrated) data to be stored into the memory cell array, and drive bit lines according to the received data. The read/write circuit 320 may include a plurality of page buffers 322 to 326 respectively corresponding to columns (or bit lines) or column pairs (or bit line pairs), and each of the page buffers 322 to 326 may include a plurality of latches (not illustrated).

The memory device 150 may be embodied by a 2D or 3D memory device. Particularly, as illustrated in FIG. 4, the memory device 150 may be embodied by a nonvolatile memory device having a 3D stack structure. When the memory device 150 has a 3D structure, the memory device 150 may include a plurality of memory blocks BLK0 to BLKN–1. Herein, FIG. 4 is a block diagram illustrating the memory blocks 152, 154 and 156 of the memory device 150 shown in FIG. 1. Each of the memory blocks 152, 154 and 156 may be realized in a 3D structure (or vertical structure). For example, the memory blocks 152, 154 and 156 may include structures of a three-dimensional structure that are extended in first to third directions, e.g., an x-axis direction, a y-axis direction, and a z-axis direction.

Each memory block 330 included in the memory device 150 may include a plurality of NAND strings NS that are extended in the second direction, and a plurality of NAND strings NS that are extended in the first direction and the third direction. Herein, each of the NAND strings NS may be coupled to a bit line BL, at least one string selection line SSL, at least one ground selection line GSL, a plurality of word lines WL, at least one dummy word line DWL, and a common source line CSL, and each of the NAND strings NS may include a plurality of transistor structures TS.

In short, each memory block 330 among the memory blocks 152, 154 and 156 of the memory device 150 may be coupled to a plurality of bit lines BL, a plurality of string selection lines SSL, a plurality of ground selection lines GSL, a plurality of word lines WL, a plurality of dummy word lines DWL, and a plurality of common source lines CSL, and each memory block 330 may include a plurality of NAND strings NS. Also, in each memory block 330, one bit line BL may be coupled to a plurality of NAND strings NS to realize a plurality of transistors in one NAND string NS. Also, a string selection transistor SST of each NAND string NS may be coupled to a corresponding bit line BL, and a ground selection transistor GST of each NAND string NS may be coupled to a common source line CSL. Herein, memory cells MC may be provided between the string selection transistor SST and the ground selection transistor GST of each NAND string NS. In other words, a plurality of memory cells may be realized in each memory block 330 of the memory blocks 152, 154 and 156 of the memory device 150. Hereafter, a data processing operation for a memory device, particularly, a data processing operation performed when a plurality of command operations corresponding to a plurality of commands received from the host 102 are performed, in a memory system in accordance with an embodiment of the present invention is described in detail with reference to FIGS. 5 to 9.

FIGS. 5 to 8 exemplarily show a data processing operation when a foreground operation and a background operation are performed for a memory device in a memory system in accordance with an embodiment of the present invention. In this embodiment of the present invention, the foreground operation (for example, a plurality of command operations corresponding to a plurality of commands received from the host 102) for the memory device 150 and the background operation (for example, a garbage collection operation or a read reclaim operation as a copy operation, and a wear-leveling operation as a swap operation, or a map flush operation) for the memory device 150 are taken as examples and described specifically.

Particularly, in this embodiment of the present invention, for the sake of convenience in description, a case in which the memory system 110 shown in FIG. 1 receives a plurality of commands from the host 102 and performs the command operations corresponding to the received commands is taken as an example and described specifically. For example, the memory system 110 may receive a plurality of write commands from the host 102 and perform program operations corresponding to the write commands, or the memory system 110 may receive a plurality of read commands from the host 102 and perform read operations corresponding to the read commands, or the memory system 110 may receive a plurality of erase commands from the host 102 and perform erase operations corresponding to the erase commands, or the memory system 110 may receive a plurality of write commands and a plurality of read commands together from the host 102 and perform program operations and read operations corresponding to the write commands and the read commands.

Also, a case in which write data corresponding to a plurality of write commands received from the host 102 are stored in a buffer/cache included in the memory 144 of the controller 130, and then the data stored in the buffer/cache are programmed and stored in a plurality of memory blocks included in the memory device 150 (in short, program operations are performed), and also map data are updated corresponding to the program operations into the memory device 150 and then the updated map data are stored in the memory blocks included in the memory device 150 is taken as an example and described in the embodiment of the present invention. In short, a case in which program operations corresponding to a plurality of write commands received from the host 102 are performed is taken as an example and described.

Also, a case in which when a plurality of read commands are received from the host 102 for the data stored in the memory device 150, the data corresponding to the read commands are read from the memory device 150 by detecting the map data for the data corresponding to the read commands and the read data are stored in the buffer/cache included in the memory 144 of the controller 130 and the data stored in the buffer/cache are transferred to the host 102 is taken as an example and described in the embodiment of the present invention. In short, a case in which read operations corresponding to the read commands received from the host 102 are performed is taken as an example and described in the embodiment of the present invention.

Also, a case in which when a plurality of erase commands are received from the host 102 for the memory blocks included in the memory device 150, the memory blocks corresponding to the erase commands are detected and the data stored in the detected memory blocks are erased and the map data are updated corresponding to the erased data and the updated map data are stored in the memory blocks included in the memory device 150 is taken as an example and described in the embodiment of the present invention. In short, a case in which erase operations corresponding to the erase commands received from the host 102 are performed is taken as an example and described in the embodiment of the present invention.

Herein, in an embodiment of the present invention the command operations performed to the memory system 110 are performed by the controller 130. However, this is not more than an example and, as described above, the processor 134 included in the controller 130, e.g., the FTL, may perform the command operations.

Also, it this embodiment of the present invention, the controller 130 may program and store the user data corresponding to the write commands received from the host 102 and metadata in some memory blocks among the memory blocks included in the memory device 150, read the user data corresponding to the read commands received from the host 102 and metadata from the memory blocks storing the user data and the metadata among the memory blocks included in the memory device 150, and transfer the read user data and metadata to the host 102, or erase the user data corresponding to the erase commands received from the host 102 and metadata from the memory blocks storing the user data and the metadata among the memory blocks included in the memory device 150.

Herein, the metadata may include a first map data including Logical to Physical (L2P) information (which is called logical information, hereafter) for the data stored in memory blocks through a program operation, and a second map data including Physical to Logical (P2L) information (which is called physical information, hereafter). Also, the metadata may include information on the command data corresponding to a command received from the host 102, information on a command operation corresponding to the command, information on the memory blocks of the memory device 150 where the command operation is performed, and information on the map data corresponding to the command operation. In other words, the metadata may include all the other informations and data except the user data corresponding to a command received from the host 102.

According to the embodiment of the present invention, the controller 130 may perform command operations corresponding to a plurality of commands received from the host 102. For example, when the controller 130 receives write commands from the host 102, the controller 130 may perform program operations corresponding to the write commands. Herein, the controller 130 may program and store user data corresponding to the write commands in the memory blocks of the memory device 150, such as empty memory blocks where an erase operation is performed, open memory blocks, or free memory blocks. Also, the controller 130 may program and store mapping information between the logical addresses and the physical addresses for the user data stored in the memory blocks (which are first map data including an L2P map table or an L2P map list containing logical information) and mapping information between the physical addresses and the logical addresses for the memory blocks storing the user data (which are second map data including a P2L map table or a P2L map list containing physical information) in the empty memory blocks, open memory blocks, or free memory blocks among the memory blocks included in the memory device 150.

When the controller 130 receives write commands from the host 102, the controller 130 may program and store user data corresponding to the write commands in the memory blocks and store metadata that includes the first map data and the second map data for the user data stored in the memory blocks in memory blocks. Particularly, since data segments of the user data are stored in the memory blocks of the memory device 150, the controller 130 may generate and update meta segments of the meta data, which are map segments of map data including L2P segments of the first map data and P2L segments of the second map data, and store them in the memory blocks of the memory device 150. Herein, the map segments stored in the memory blocks of the memory device 150 may be loaded onto the memory 144 of the controller 130 to be updated.

Also, when the controller 130 receives a plurality of read commands from the host 102, the controller 130 may read out the read data corresponding to the read commands from the memory device 150, store the read data in the buffer/cache included in the memory 144 of the controller 130, transfer the data stored in the buffer/cache to the host 102. In this way, read operations corresponding to the read commands may be performed.

Also, when the controller 130 receives a plurality of erase commands from the host 102, the controller 130 may detect memory blocks of the memory device 150 that correspond to the erase commands and perform erase operations onto the detected memory blocks.

According to the embodiment of the present invention, when the controller 130 performs background operations along with command operations corresponding to a plurality of commands received from the host 102, such as a garbage collection operation or a read reclaim operation for a copy operation, a wear-leveling operation for a swap operation, or a map flash operation, the controller 130 may load and store the data corresponding to the background operations, which include metadata and user data, in the buffer/cache included in the memory 144 of the controller 130, and store them in the memory device 150. For example, when the controller 130 performs a background operation, the controller 130 may check the metadata and the user data corresponding to the background operation in the memory blocks of the memory device 150, load and store the metadata and the user data stored in some memory blocks among the memory blocks of the memory device 150 in the buffer/cache included in the memory 144 of the controller 130, and store them in other memory blocks among the memory blocks of the memory device 150. Hereafter, a data processing operation performed to the memory system in accordance with the embodiments of the present invention is described in detail with reference to FIGS. 5 to 8.

Figure 5:
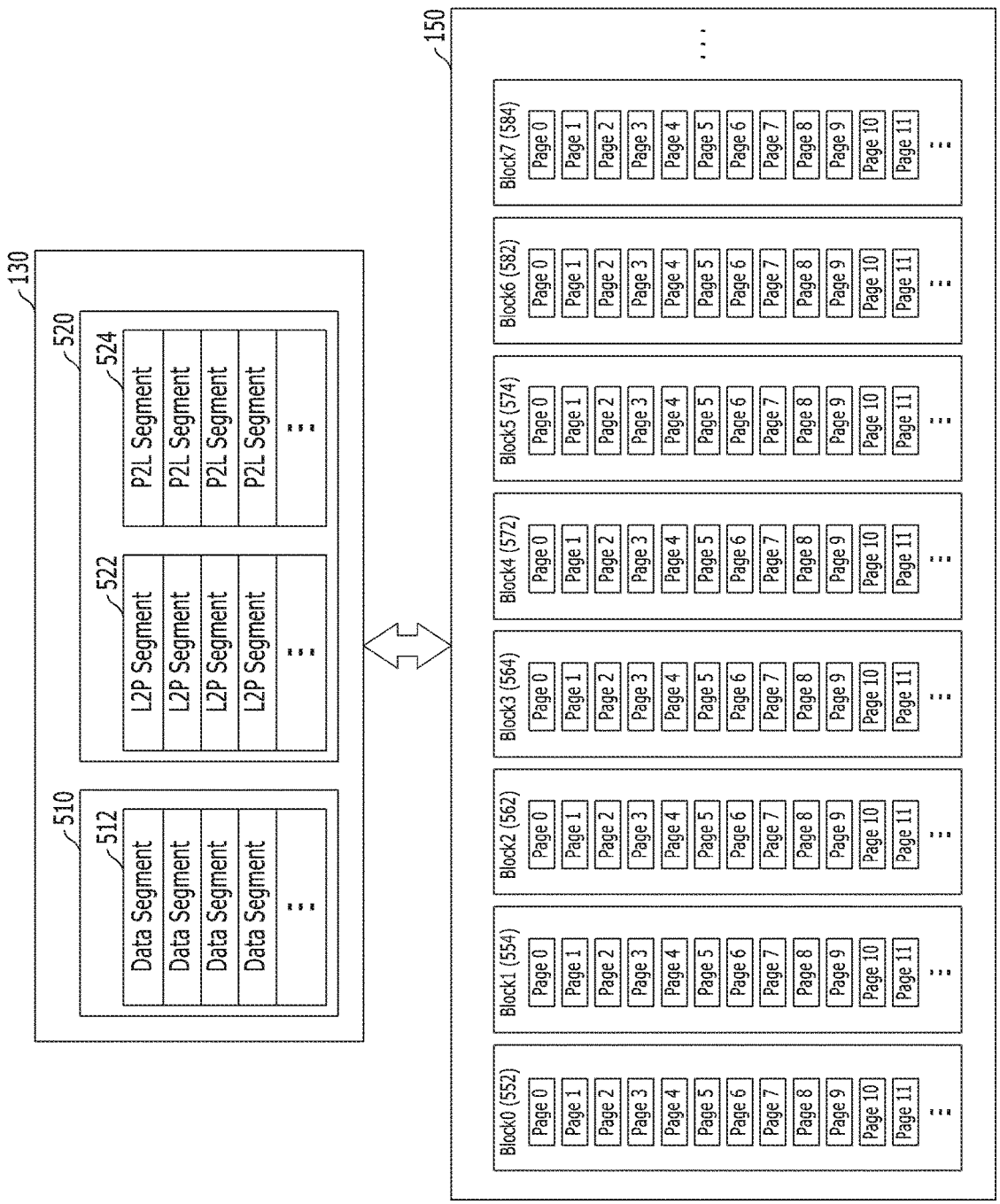
FIGS. 5 to 8 exemplarily show a data processing operation when a foreground operation and a background operation are performed for a memory device in a memory system in accordance with an embodiment of the present invention.

First of all, referring to FIG. 5, the controller 130 may perform command operations corresponding to a plurality of commands received from the host 102. For example, the controller 130 may perform program operations corresponding to a plurality of write commands received from the host 102. Herein, the controller 130 may program and store user data corresponding to the write commands in memory blocks 552, 554, 562, 564, 572, 574, 582 and 584 of the memory device 150, and generate and update metadata for the user data when the program operation is performed onto the memory blocks 552, 554, 562, 564, 572, 574, 582 and 584, and then store the generated and updated metadata in the memory blocks 552, 554, 562, 564, 572, 574, 582 and 584 of the memory device 150.

Herein, the controller 130 may generate and update information representing that the user data are stored in the pages included in the memory blocks 552, 554, 562, 564, 572, 574, 582 and 584 of the memory device 150, e.g., the first map data and the second map data, and store the generated and updated information in the pages included in the memory blocks 552, 554, 562, 564, 572, 574, 582 and 584 of the memory device 150. In other words, the controller 130 may generate and update logical segments of the first map data, which include L2P segments, and physical segments of the second map data, which include P2L segments, and store the generated and updated logical segments in the pages included in the memory blocks 552, 554, 562, 564, 572, 574, 582 and 584 of the memory device 150.

For example, the controller 130 may cache and buffer the user data corresponding to the write commands received from the host 102 in the first buffer 510 included in the memory 144 of the controller 130, in other words, the controller 130 may store the data segments 512 of the user data in the first buffer 510, which is a data buffer/cache, and store the data segments 512 stored in the first buffer 510 in the pages included in the memory blocks 552, 554, 562, 564, 572, 574, 582 and 584 of the memory device 150. Since the data segments 512 of the user data corresponding to the write commands received from the host 102 are programmed and stored in the pages included in the memory blocks 552, 554, 562, 564, 572, 574, 582 and 584 of the memory device 150, the controller 130 may generate and update the first map data and the second map data and store them in the second buffer 520 included in the memory 144 of the controller 130. In short, the controller 130 may store the L2P segments 522 of the first map data and the P2L segments 524 of the second map data for the user data in the second buffer 520, which is a map buffer/cache. Herein, as described above, the L2P segments 522 of the first map data and the P2L segments 524 of the second map data or a map list for the L2P segments 522 of the first map data and a map list for the P2L segments 524 of the second map data may be stored in the second buffer 520 in the memory 144 of the controller 130. Also, the controller 130 may store the L2P segments 522 of the first map data and the P2L segments 524 of the second map data that are stored in the second buffer 520 in the pages stored in the memory blocks 552, 554, 562, 564, 572, 574, 582 and 584 of the memory device 150.

Also, the controller 130 may perform command operations corresponding to a plurality of commands received from the host 102. For example, the controller 130 may perform read operations corresponding to a plurality of read commands received from the host 102. Herein, the controller 130 may load and check out the map segments of the map data for the user data corresponding to the read commands, e.g., the L2P segments 522 of the first map data and the P2L segments 524 of the second map data, onto the second buffer 520, and then read the user data stored in the pages of the corresponding memory blocks among the memory blocks 552, 554, 562, 564, 572, 574, 582 and 584 of the memory device 150, store the data segments 512 of the read user data in the first buffer 510, and transfer them to the host 102.

Also, the controller 130 may perform command operations corresponding to a plurality of commands received from the host 102. In other words, the controller 130 may perform erase operations corresponding to a plurality of erase commands received from the host 102. Herein, the controller 130 may check memory blocks corresponding to the erase commands among the memory blocks 552, 554, 562, 564, 572, 574, 582 and 584 of the memory device 150, and perform the erase operations onto the checked memory blocks.

When a background operation, for example, an operation of copying data or swapping data from the memory blocks included in the memory device 150, such as a read reclaim operation, a garbage collection operation, or a wear-leveling operation, is performed, the controller 130 may store the data segments 512 of the corresponding user data in the first buffer 510, load the map segments 522 and 524 of the map data corresponding to the user data onto the second buffer 520, and perform the read reclaim operation, the garbage collection operation, or the wear-leveling operation. Also, the controller 130 may perform a background operation. For example, when the controller 130 performs a map update operation and a map flush operation of map data, which are metadata for the memory blocks of the memory device 150, the controller 130 may load the corresponding map segments 522 and 524 into the second buffer 520, and perform a map update operation and a map flush operation.

Figure 6:
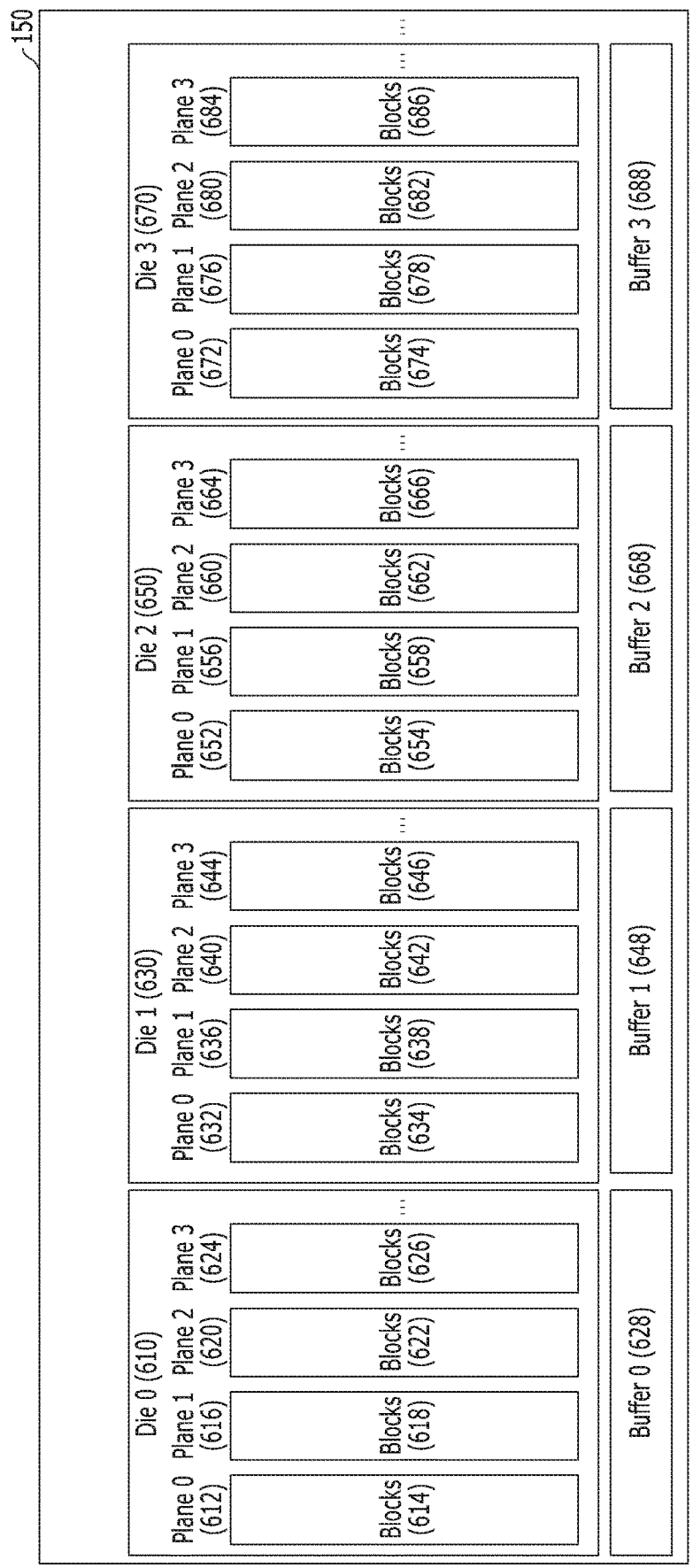

Also, referring to FIG. 6, the memory device 150 may include a plurality of memory dies, e.g., a memory die 0 610, a memory die 1 630, a memory die 2 650, and a memory die 3 670. Each of the memory dies 610, 630, 650 and 670 may include a plurality of planes. For example, the memory die 0 610 may include a plane 0 612, a plane 1 616, a plane 2 620 and a plane 3 624. The memory die 1 630 may include a plane 0 632, a plane 1 636, a plane 2 640 and a plane 3 644. The memory die 2 650 may include a plane 0 652, a plane 1 656, a plane 2 660 and a plane 3 664. The memory die 3 670 may include a plane 0 672, a plane 1 676, a plane 2 680 and a plane 3 684. Each of the planes 612, 616, 620, 624, 632, 636, 640, 644, 652, 656, 660, 664, 672, 676, 680 and 684 of the memory dies 610, 630, 650 and 670 may include a plurality of memory blocks 614, 618, 622, 626, 634, 638, 642, 646, 654, 658, 662, 666, 674, 678, 682 and 686. For example, as described earlier with reference to FIG. 2, N blocks Block 0, Block 1, . . . , Block N−1 including a plurality of pages, e.g., $2^M$ pages. Also, the memory device 150 may include a plurality of buffers that respectively correspond to the memory dies 610, 630, 650 and 670. For example, the memory device 150 may include a buffer 0 628 corresponding to the memory die 0 610, a buffer 1 648 corresponding to the memory die 1 630, a buffer 2 668 corresponding to the memory die 2 650, and a buffer 3 688 corresponding to the memory die 3 670.

When command operations corresponding to a plurality of commands received from the host 102 are performed, data corresponding to the command operations may be stored in the buffers 628, 648, 668 and 688 included in the memory device 150. For example, when program operations are performed, data corresponding to the program operations may be stored in the buffers 628, 648, 668 and 688, and then stored in the pages included in the memory blocks of the memory dies 610, 630, 650 and 670. When read operations are performed, data corresponding to the read operations may be read from the pages included in the memory blocks of the memory dies 610, 630, 650 and 670, stored in the buffers 628, 648, 668 and 688, and transferred to the host 102 through the controller 130.

Herein, in the embodiment of the present invention, a case in which the buffers 628, 648, 668 and 688 included in the memory device 150 exist in the outside of the corresponding memory dies 610, 630, 650 and 670 is taken as an example and described. However, the buffers 628, 648, 668 and 688 included in the memory device 150 may exist in the inside of the corresponding memory dies 610, 630, 650 and 670. Also, the buffers 628, 648, 668 and 688 may correspond to the planes 612, 616, 620, 624, 632, 636, 640, 644, 652, 656, 660, 664, 672, 676, 680 and 684 or the memory blocks 614, 618, 622, 626, 634, 638, 642, 646, 654, 658, 662, 666, 674, 678, 682 and 686 in the memory dies 610, 630, 650 and 670. In the embodiment of the present invention, a case in which the buffers 628, 648, 668 and 688 included in the memory device 150 are a plurality of page buffers 322, 324 and 326 included in the memory device 150 is described as an example, as described earlier with reference to FIG. 3. However, the buffers 628, 648, 668 and 688 included in the memory device 150 may be a plurality of caches or a plurality of registers included in the memory device 150.

Also, the memory blocks included in the memory device 150 may be grouped into a plurality of super memory blocks, and then command operations may be performed onto the super memory blocks. Herein, each of the super memory blocks may include a plurality of memory blocks, for example, memory blocks included in a first memory block group and a second memory block group. Herein, when the first memory block group is included in a first plane of a first memory die, the second memory block group may be included in the first plane of the first memory die or a second plane of the first memory die. Also, the second memory block group may be included in the planes of the second memory die. Hereafter, when a foreground operation and a background operation are performed for the memory device 150, the process of scheduling queues corresponding to the foreground operation and the background operation and allocating the scheduled queues to the memory 144 of the controller 130, and performing the foreground operation and the background operation through the corresponding queues in the memory system in accordance with the embodiment of the present invention may be described in detail by taking an example with reference to FIGS. 7 and 8.

Figure 7:
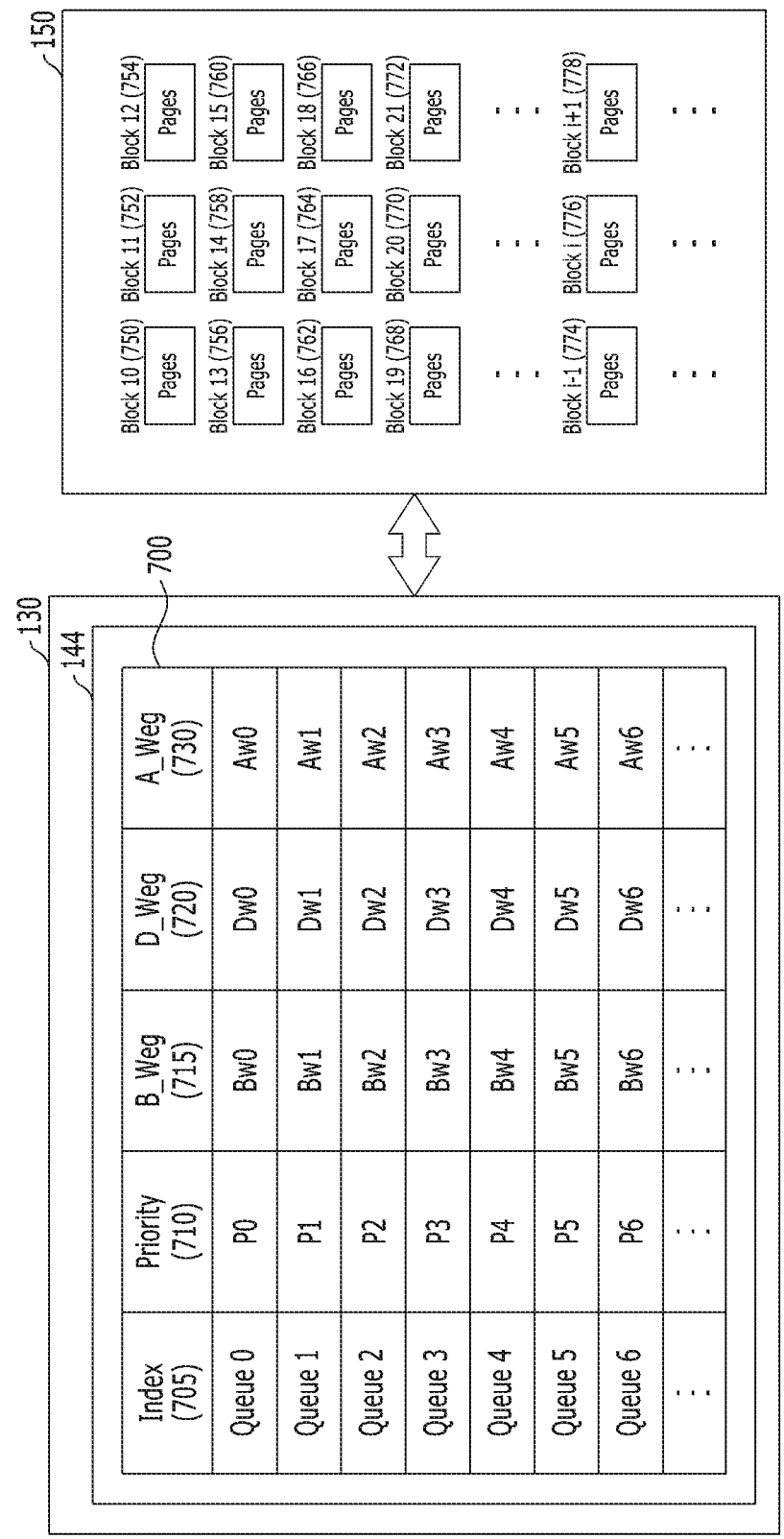

Referring to FIG. 7, when a foreground operation and a background operation are performed onto the memory blocks included in the memory device 150, the controller 130 may check the foreground operation and the background operation and, particularly, check the priorities and the weights for the foreground operation and the background operation, scheduling queues corresponding to the foreground operation and the background operation in consideration of the priority and the weight, may allocate the queues to the memory 144 of the controller 130, and may perform the foreground operation and the background operation through the queues allocated to the memory 144 of the controller 130.

Herein, when command operations (e.g., program operations, read operations, or erase operations) corresponding to a plurality of commands received from the host 102 or background operations (e.g., a swap operation or a copy operation such as a wear-leveling operation, a read reclaim operation, a garbage collection operation, or a map flush operation) are performed, the controller 130 may allocate the queues corresponding to the operations to the memory 144 of the controller 130 by scheduling the queues corresponding to the operations in consideration of the priorities and the weights of the operations.

To be specific, the controller 130 may perform the foreground operation and the background operation to a plurality of memory blocks (e.g., a memory block 10 750, a memory block 11 752, a memory block 12 754, a memory block 13 756, a memory block 14 758, a memory block 15 760, a memory block 16 762, a memory block 17 764, a memory block 18 766, a memory block 19 768, a memory block 20 770, a memory block 21 772, a memory block i−1 774, a memory block i 776, and a memory block i+1 778) included in the memory device 150.

Herein, the controller 130 may schedule the queues corresponding to the foreground operation and the background operation and allocate the scheduled queues to the memory 144 of the controller 130 in order to perform the foreground operation and the background operation to the memory blocks 750, 752, 754, 756, 758, 760, 762, 764, 766, 768, 770, 772, 774, 776 and 778.

Herein, when the foreground operation and the background operation are performed, the controller 130 may check the priorities and the weights for the foreground operation and the background operation, and then schedule the queues corresponding to the foreground operation and the background operation in consideration of the priorities and the weights for the foreground operation and the background operation. Herein, the controller 130 may check the queues corresponding to the foreground operation and the background operation and also check the priorities and the weights for the foreground operation and the background operation, that is, check the priorities and the weights of the queues corresponding to the foreground operation and the background operation.

The controller 130 may register the priorities and the weights of the queues corresponding to the foreground operation and the background operation in a scheduling table 700 for each index 705 of the queues corresponding to the foreground operation and the background operation. Herein, the scheduling table 700 may be metadata for the memory device 150. Thus, the scheduling table 700 may be stored in the second buffer 520 included in the memory 144 of the controller 130 and also stored in the memory device 150 as well.

For example, when command operations are performed as a foreground operation, as described above, the controller 130 may check the priorities and the weights of the queues corresponding to the command operations, schedule the queues corresponding to the command operations in consideration of the priorities and the weights, allocate the scheduled queues to the memory 144 of the controller 130, and perform the command operations through the queues allocated to the memory 144 of the controller 130. Herein, the controller 130 may register the priorities and the weights of the queues corresponding to the command operations in the scheduling table 700, check the priorities and the weights of the queues corresponding to the command operations from the scheduling table 700, and schedule the queues corresponding to the command operations.

For example, a queue 0 in the scheduling table 700 may represent a program task queue corresponding to the program operations among the command operations. A queue 1 in the scheduling table 700 may represent a read task queue corresponding to the read operations among the command operations. A queue 2 in the scheduling table 700 may represent an erase task queue corresponding to the erase operations among the command operations.

Also, as described above, when background operations are performed, the controller 130 may check the priorities and the weights of the queues corresponding to the background operations, schedule the queues corresponding to the background operations in consideration of the priorities and the weights, allocate the scheduled queues to the memory 144 of the controller 130, and perform the background operations through the queues allocated to the memory 144 of the controller 130. Herein, the controller 130 may register the priorities and the weights of the queues corresponding to the background operations in the scheduling table 700, check the priorities and the weights of the queues corresponding to the background operations from the scheduling table 700, and schedule the queues corresponding to the background operation.

For example, the queue 3 in the scheduling table 700 may represent a map task queue corresponding to a map update operation and a map flush operation of the background operation. The queue 4 in the scheduling table 700 may represent a wear-leveling task queue corresponding to a swap operation, i.e., a wear-leveling operation. The queue 5 in the scheduling table 700 may represent a garbage collection task queue corresponding to a copy operation, i.e., a garbage collection operation. The queue 6 in the scheduling table 700 may represent a read reclaim task queue corresponding to a copy operation, i.e., a read reclaim operation.

Herein, the map task queue may also represent queues corresponding to the map data of the background operation. Accordingly, the map task queue may include a wear-leveling map task queue corresponding to map data of the wear-leveling operation, a garbage collection map task queue corresponding to map data of the garbage collection operation, and a read reclaim map task queue corresponding to map data of the read reclaim operation.

Also, the controller 130 may decide the priorities for the foreground operations and the background operations performed to the memory device 150. Particularly, the controller 130 may decide the priorities for the foreground operations and the background operations in consideration of the importance and reliability of the foreground operations and the background operations or the importance and reliability of data corresponding to the foreground operations and the background operations. The controller 130 may decide the priorities 710 of the queues corresponding to the foreground operations and the background operations based on the priorities of the foreground operation and the background operation, and register the priorities 710 in the scheduling table 700 for each index 705 of the queues.

Herein, the controller 130 may decide the fixed priorities of the queues (e.g., the program task queue, the read task queue and the erase task queue) corresponding to the foreground operations and the map task queue among the queues corresponding to the background operation.

Also, the controller may decide the dynamic priorities to the wear-leveling task queue, the garbage collection task queue, and the read reclaim task queue among the queues corresponding to the background operation.

In particular, the controller 130 may decide the priorities 710 in such a manner that the queues with the fixed priorities have a higher priority than the task queues with the dynamic priorities. Also, the controller 130 may decide the priorities 710 in such a manner that the program task queue, the read task queue and the erase task queue have a higher priority than the map task queue among the task queues with the fixed priorities.

Also, when it is required to perform a garbage collection operation to the memory device 150 prior to other background operations (e.g., a wear-leveling operation or a read reclaim operation), the controller 130 may decide the priorities 710 in such a manner that the garbage collection task queue has higher priority. Also, when it is required to perform a wear-leveling operation to the memory device 150 prior to other background operations (e.g., a garbage collection operation or a read reclaim operation), the controller 130 may decide the priorities 710 in such a manner that the wear-leveling task queue has higher priority. Also, when it is required to perform a read reclaim operation for the memory device 150 prior to other background operations (e.g., a garbage collection operation or a wear-leveling operation), the controller 130 may decide the priorities 710 in such a manner that the read reclaim task queue has higher priority.

Also, the controller 130 may decide the weights for the foreground operations and the background operations performed to the memory device 150. Particularly, the controller 130 may decide the weights for the foreground operations and the background operations in consideration of the number of frequencies and the operation rate of the foreground operations and the background operations which are performed. The controller 130 may decide basic weights 715 of the queues corresponding to the foreground operations and the background operations based on the weights of the foreground operations and the background operations, and register the basic weights 715 in the scheduling table 700 for each index 705 of the queues.

Herein, the controller 130 may decide a first weight to the queues (e.g., the program task queue, the read task queue and the erase task queue) corresponding to the foreground operations and the map task queue among the queues corresponding to the background operation.

Also, the controller may decide a second weight to the wear-leveling task queue, the garbage collection task queue, and the read reclaim task queue among the queues corresponding to the background operation.

In particular, the controller 130 may decide the basic weights 715 in such a manner that the first weight is greater than the second weight.

Also, the controller 130 may accumulate the basic weights 715 that are set to the queues corresponding to the foreground operations and the background operations, whenever the foreground operations and the background operations are performed to the memory device 150. As the basic weights 715 are accumulated according to the foreground operations and the background operations performed to the memory device 150, the controller 130 may decide accumulated weights 730 for the queues corresponding to the foreground operations and the background operations and register the accumulated weights 730 in the scheduling table 700 for each index 705 of the queues.

Also, when the foreground operation and the background operation are performed to the memory device 150, the controller 130 may decide the weights for the foreground operation and the background operation in consideration of the size of data corresponding to the foreground operation and the background operation. The controller 130 may decide dynamic weights 720 for the queues corresponding to the foreground operation and the background operation based on the weights decided according to the size of the data corresponding to the foreground operation and the background operation, and register the dynamic weights 720 in the scheduling table 700 for each index 705 of the queues.

Herein, the controller 130 may decide the dynamic weights 720 for the program task queue, the read task queue and the erase task queue in consideration of the size of the data corresponding to the foreground operation and the background operation, in other words, the size of write data corresponding to a program operation, the size of read data corresponding to a read operation, the size of erase data corresponding to an erase operation.

In particular, the controller 130 may perform a calculation to the basic weights 715 or the priorities 710 for the program task queue, the read task queue and the erase task queue and the size of the write data, the size of the read data, the size of the erase data in order to decide the dynamic weight 720 for each index 705 of the queues.

For example, the controller 130 may decide a dynamic weight Dw0 for the program task queue by multiplying a basic weight Bw0 or a priority P0 for the program task queue by the size of the write data. Also, the controller 130 may decide a dynamic weight Dw1 for the read task queue by multiplying a basic weight Bw1 or a priority P1 for the read task queue by the size of the read data. Also, the controller 130 may decide a dynamic weight Dw2 for the erase task queue by multiplying a basic weight Bw2 or a priority P2 for the erase task queue by the size of the erase data.

Also, the controller 130 may decide the dynamic weights 720 for the map task queue, the wear-leveling task queue, the garbage collection task queue, and the read reclaim task queue in consideration of the size of the data corresponding to the background operation, in other words, the size of the map data corresponding to a map update operation and a map flush operation as well as the size of the map data corresponding to the background operation (e.g., the wear-leveling operation, the garbage collection operation, and the read reclaim operation), the size of wear-leveling data corresponding to the wear-leveling operation, the size of garbage collection data corresponding to the garbage collection operation, and the size of read reclaim data corresponding to the read reclaim operation.

In particular, the controller 130 may perform a calculation to the basic weights 715 or the priority 710 for the map task queue, the wear-leveling task queue, the garbage collection task queue, and the read reclaim task queue and the size of the map data, the size of the wear-leveling data, the size of the garbage collection data, and the size of the read reclaim data in order to decide the dynamic weight 720 for each index 705 of the queues.

Herein, the size of the wear-leveling data, the size of the garbage collection data, and the size of the read reclaim data may be decided based on the number of memory blocks where the wear-leveling operation, the garbage collection operation, and the read reclaim operation are performed among the memory blocks of the memory device 150, the number of valid pages included in the memory blocks, and the size of valid data stored in the memory blocks. Also, the memory blocks where the wear-leveling operation, the garbage collection operation, and the read reclaim operation are performed among the memory blocks of the memory device 150 may become source memory blocks or victim memory blocks that are selected in consideration of parameters (e.g., an erase count, a program count, a valid page count (VPC), or a read count) for the memory blocks of the memory device 150.

For example, the controller 130 may decide a dynamic weight Dw3 for the map task queue by multiplying a basic weight Bw3 or a priority P3 for the map task queue by the size of the map data. Also, the controller 130 may decide a dynamic weight Dw4 for the wear-leveling task queue by multiplying a basic weight Bw4 or a priority P4 for the wear-leveling task queue by the size of the wear-leveling data. Also, the controller 130 may decide a dynamic weight Dw5 for the garbage collection task queue by multiplying a basic weight Bw5 or a priority P5 for the garbage collection task queue by the size of the garbage collection data. Also, the controller 130 may decide a dynamic weight Dw6 for the read reclaim task queue by multiplying a basic weight Bw6 or a priority P6 for the read reclaim task queue by the size of the read reclaim data.

In short, as described above, the controller 130 may decide the priorities 710 and the weights (i.e., the basic weights 715, the dynamic weight 720, and the accumulated weights 730) for each index 705 of the queues corresponding to the foreground operation and the background operation performed onto the memory blocks of the memory device 150, and register the decided priorities 710 and the weights in the scheduling table 700. Also, the controller 130 may schedule the queues corresponding to the foreground operation and the background operation performed onto the memory blocks of the memory device 150 and allocate the scheduled queues to the memory 144 of the controller 130 in consideration of the priorities 710 and the weights 715, 720 and 730 for the queues that are registered in the scheduling table 700.

Herein, the controller 130 may sequentially schedule the queues from the queues of higher priorities or greater weights and allocate the scheduled queues to the memory 144 of the controller 130 in consideration of the priorities 710 and the weights 715, 720 and 730 for the queues that are registered in the scheduling table 700. In particular, when the capacity of the memory 144 is smaller than the capacity of the queues corresponding to the foreground operation and the background operation, the controller 130 may sequentially schedule the queues from the queue of the highest priority in the priorities 710 registered in the scheduling table 700 or the queue of the greatest weight among the weights 715, 720 and 730 registered in the scheduling table 700, and allocate the scheduled queues to the memory 144 of the controller 130.

For example, when the accumulated weights 730 registered in the scheduling table 700 are equal to or less than an accumulated threshold value, as described above, the controller 130 may sequentially schedule the queues from the queues of the greater dynamic weights in consideration of the dynamic weights 720 that are decided based on the calculation to the priorities 710 or the basic weights 715 for the queues and the size of data.

Also, when the accumulated weights 730 registered in the scheduling table 700 exceed an accumulated threshold value, as described above, the controller 130 may schedule the queues in consideration of the accumulated weights 730 and the dynamic weights 720 that are decided based on the calculation to the priorities 710 or the basic weights 715 for the queues and the size of data. For example, the controller 130 may normalize the dynamic weight 720 by the accumulated weights 730 and then sequentially schedule the queues in consideration of the normalized dynamic weight, in other words, sequentially schedule the queues from the queues of the greater normalized dynamic weight.

Herein, the controller 130 may calculate a normalized dynamic weight for the program task queue by normalizing the dynamic weight Dw0 for the program task queue by an accumulated weight Aw0 (e.g., Dw0\*Aw0/accumulated threshold value). Also, the controller 130 may calculate a normalized dynamic weight for the read task queue by normalizing the dynamic weight Dw1 for the read task queue by an accumulated weight Aw1 (e.g., Dw1\*Aw1/accumulated threshold value). Also, the controller 130 may calculate a normalized dynamic weight for the erase task queue by normalizing the dynamic weight Dw2 for the erase task queue by an accumulated weight Aw2 (e.g., Dw2\*Aw2/accumulated threshold value). Also, the controller 130 may calculate a normalized dynamic weight for the erase task queue by normalizing the dynamic weight Dw3 for the map task queue by an accumulated weight Aw3 Dw3 Aw3/accumulated threshold value). Also, the controller 130 may calculate a normalized dynamic weight for the wear-leveling task queue by normalizing the dynamic weight Dw4 for the wear-leveling task queue by an accumulated weight Aw4 (e.g., Dw4\*Aw4/accumulated threshold value). Also, the controller 130 may calculate a normalized dynamic weight for the garbage collection task queue by normalizing the dynamic weight Dw5 for the garbage collection task queue by an accumulated weight Aw5 (e.g., Dw5*Aw5/accumulated threshold value). Also, the controller 130 may calculate a normalized dynamic weight for the read reclaim task queue by normalizing the dynamic weight Dw6 for the read reclaim task queue by an accumulated weight Aw6 (e.g., Dw6*Aw6/accumulated threshold value).

Also, the controller 130 may initialize the priorities 710 and weights 715, 720 and 730 for the queues registered in the scheduling table 700. In short, the controller 130 may initialize the priorities 710 and weights 715, 720 and 730 for the queues corresponding to the foreground operation and the background operation. In particular, when the foreground operation and the background operation are performed over a threshold value in the memory blocks of the memory device 150 or the foreground operation and the background operation are performed through the queues allocated to the memory 144 of the controller 130, the controller 130 may initialize the priorities 710 and weights 715, 720 and 730 for the queues corresponding to the foreground operation and the background operation.

Hereafter, the foreground operation and the background operation performed by the controller 130 in the memory blocks of the memory device 150 in consideration of the priorities 710 and weights 715, 720 and 730 registered in the scheduling table 700 in the memory system in accordance with the embodiment of the present invention are described in detail with reference to FIG. 8.

Figure 8:
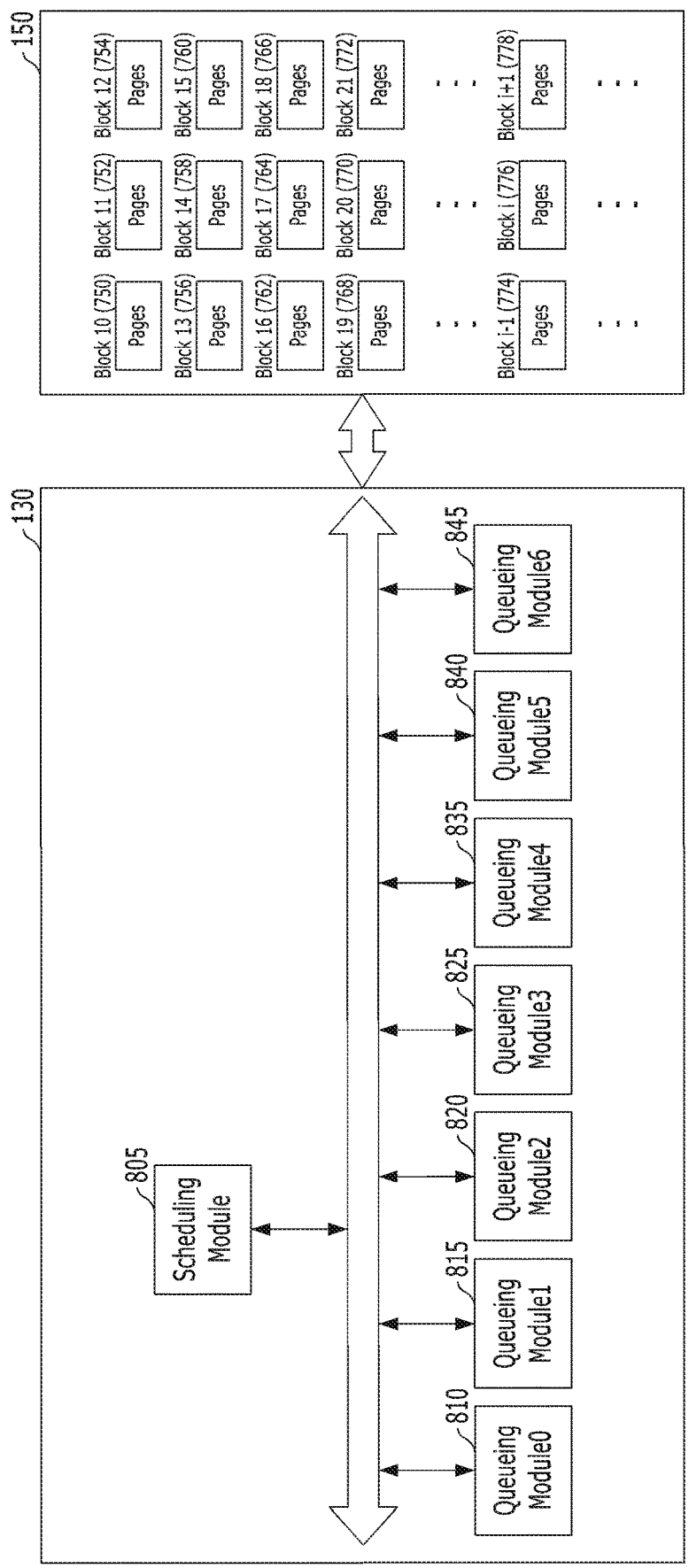

Referring to FIG. 8, when the foreground operation and the background operation are performed to the memory blocks 750, 752, 754, 756, 758, 760, 762, 764, 766, 768, 770, 772, 774, 776 and 778 of the memory device 150, the controller 130 may schedule the queues corresponding to the foreground operation and the background operation through a scheduling module 805 and allocate the scheduled queues to the memory 144 of the controller 130 in consideration of the priorities 710 and the weights 715, 720 and 730 for the queues registered in the scheduling table 700. As a result, queueing modules 810, 815, 820, 825, 835, 840 and 845 for the queues corresponding to the foreground operation and the background operation may be allocated to the memory 144 of the controller 130.

Herein, the scheduling module 805 may be realized through the processor 134 included in the controller 130. In other words, the scheduling module 805 may schedule the queues through the processor 134, i.e., the FTL. Also, when the controller 130 performs the foreground operation and the background operation onto the memory blocks 750, 752, 754, 756, 758, 760, 762, 764, 766, 768, 770, 772, 774, 776 and 778 of the memory device 150, the queueing modules 810, 815, 820, 825, 835, 840 and 845 may be the regions in the memory 144 for storing the data corresponding to the foreground operation and the background operation. That is, the queueing modules 810, 815, 820, 825, 835, 840 and 845 may be the buffers or caches included in the memory 144 of the controller 130. Also, it is described in this embodiment of the present invention, for the sake of convenience in description, that 7 queueing modules 810, 815, 820, 825, 835, 840 and 845 corresponding to the foreground operation and the background operation are allocated to the memory 144 of the controller 130. However, corresponding queues may be scheduled in the memory 144 of the controller 130 for each type of the foreground operation and the background operation in consideration of the priorities and the weights for the foreground operation and the background operation to the memory blocks of the memory device 150, and then a plurality of queueing modules may be allocated to store the data for each type of foreground operation and background operation.

To perform a program operation to the memory blocks 750, 752, 754, 756, 758, 760, 762, 764, 766, 768, 770, 772, 774, 776 and 778 of the memory device 150, the controller 130 may schedule the program task queue in consideration of the priorities 710 and the weights 715, 720 and 730 for the queues that are registered in the scheduling table 700, and then allocate the scheduled program task queue to the queueing module 0 810 in the memory 144 of the controller 130. When the program operation is performed to the memory blocks 750, 752, 754, 756, 758, 760, 762, 764, 766, 768, 770, 772, 774, 776 and 778 of the memory device 150, data corresponding to the program operation may be stored in the queueing module 0 810.

Also, to perform a read operation to the memory blocks 750, 752, 754, 756, 758, 760, 762, 764, 766, 768, 770, 772, 774, 776 and 778 of the memory device 150, the controller 130 may schedule the read task queue in consideration of the priorities 710 and the weights 715, 720 and 730 for the queues that are registered in the scheduling table 700, and then allocate the scheduled read task queue to the queueing module 1 815 in the memory 144 of the controller 130. When the read operation is performed to the memory blocks 750, 752, 754, 756, 758, 760, 762, 764, 766, 768, 770, 772, 774, 776 and 778 of the memory device 150, data corresponding to the read operation may be stored in the queueing module 1 815.

Also, to perform an erase operation to the memory blocks 750, 752, 754, 756, 758, 760, 762, 764, 766, 768, 770, 772, 774, 776 and 778 of the memory device 150, the controller 130 may schedule the erase task queue in consideration of the priorities 710 and the weights 715, 720 and 730 for the queues that are registered in the scheduling table 700, and then allocate the scheduled erase task queue to the queueing module 2 820 in the memory 144 of the controller 130. When the erase operation is performed to the memory blocks 750, 752, 754, 756, 758, 760, 762, 764, 766, 768, 770, 772, 774, 776 and 778 of the memory device 150, data corresponding to the erase operation may be stored in the queueing module 2 820.

Also, to perform a map update operation and a map flush operation to the memory blocks 750, 752, 754, 756, 758, 760, 762, 764, 766, 768, 770, 772, 774, 776 and 778 of the memory device 150, the controller 130 may schedule the map task queue in consideration of the priorities 710 and the weights 715, 720 and 730 for the queues that are registered in the scheduling table 700, and then allocate the scheduled map task queue to the queueing module 3 825 in the memory 144 of the controller 130. When the map update operation and a map flush operation are performed to the memory blocks 750, 752, 754, 756, 758, 760, 762, 764, 766, 768, 770, 772, 774, 776 and 778 of the memory device 150, data corresponding to the map update operation and a map flush operation may be stored in the queueing module 3 825.

Also, to perform a wear-leveling operation to the memory blocks 750, 752, 754, 756, 758, 760, 762, 764, 766, 768, 770, 772, 774, 776 and 778 of the memory device 150, the controller 130 may schedule the wear-leveling task queue in consideration of the priorities 710 and the weights 715, 720 and 730 for the queues that are registered in the scheduling table 700, and then allocate the scheduled wear-leveling task queue to the queueing module 4 835 in the memory 144 of the controller 130. When the wear-leveling operation is performed to the memory blocks 750, 752, 754, 756, 758, 760, 762, 764, 766, 768, 770, 772, 774, 776 and 778 of the memory device 150, data corresponding to the wear-leveling operation may be stored in the queueing module 4 835.

Also, to perform a garbage collection operation to the memory blocks 750, 752, 754, 756, 758, 760, 762, 764, 766, 768, 770, 772, 774, 776 and 778 of the memory device 150, the controller 130 may schedule the garbage collection task queue in consideration of the priorities 710 and the weights 715, 720 and 730 for the queues that are registered in the scheduling table 700, and then allocate the scheduled garbage collection task queue to the queueing module 5 840 in the memory 144 of the controller 130. When the garbage collection operation is performed to the memory blocks 750, 752, 754, 756, 758, 760, 762, 764, 766, 768, 770, 772, 774, 776 and 778 of the memory device 150, data corresponding to the garbage collection operation may be stored in the queueing module 5 840.

Also, to perform a read reclaim operation to the memory blocks 750, 752, 754, 756, 758, 760, 762, 764, 766, 768, 770, 772, 774, 776 and 778 of the memory device 150, the controller 130 may schedule the read reclaim task queue in consideration of the priorities 710 and the weights 715, 720 and 730 for the queues that are registered in the scheduling table 700, and then allocate the scheduled read reclaim task queue to the queueing module 6 845 in the memory 144 of the controller 130. When the read reclaim operation is performed to the memory blocks 750, 752, 754, 756, 758, 760, 762, 764, 766, 768, 770, 772, 774, 776 and 778 of the memory device 150, data corresponding to the read reclaim operation may be stored in the queueing module 6 845.

Also, the controller 130 may perform the foreground operation and the background operation to the memory blocks 750, 752, 754, 756, 758, 760, 762, 764, 766, 768, 770, 772, 774, 776 and 778 of the memory device 150 through the queueing modules 810, 815, 820, 825, 835, 840 and 845.

In the memory system in accordance with the embodiment of the present invention, when the foreground operation and the background operation are performed to a plurality of memory blocks included in the memory device 150, the controller 130 may decide the priorities and the weights for the queues corresponding to the foreground operation and the background operation, and then schedule the queues corresponding to the foreground operation and the background operation in consideration of the decided priorities and the weights, and allocate the scheduled queues to the memory 144 of the controller 130, and perform the foreground operation and the background operation to a plurality of memory blocks included in the memory device 150 through the queues allocated to the memory 144 of the controller 130. Hereafter, an operation of processing data in the memory system in accordance with the embodiment of the preset invention is described in detail with reference to FIG. 9.

Figure 9:
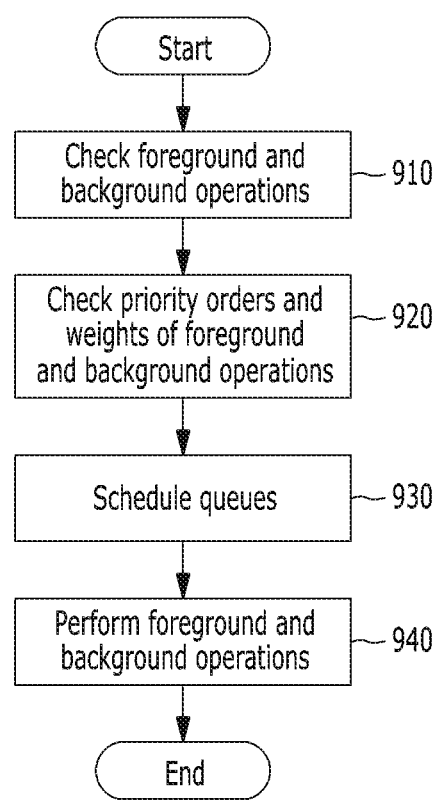
FIG. 9 is a flowchart describing an operation of processing data in the memory system in accordance with an embodiment of the present invention.

FIG. 9 is a flowchart describing an operation of processing data in a memory system in accordance with an embodiment of the present invention.

Referring to FIG. 9, in step S910, the memory system 110 may check a foreground operation and a background operation performed to the memory blocks of the memory device 150. Herein, the memory system 110 may check command operations corresponding to a plurality of commands received from the host 102 as the foreground operation performed to the memory blocks of the memory device 150, and check the background operation to the memory blocks where the command operations are performed.

In step S920, the memory system 110 may check the priorities and the weights for the foreground operation and the background operation that are performed to the memory blocks of the memory device 150.

Subsequently, in step S930, the memory system 110 may schedule the queues corresponding to the foreground operation and the background operation in consideration of the priorities and the weights, and allocate the regions corresponding to the scheduled queues to the memory 144 of the controller 130.

In step S940, the memory system 110 may perform the foreground operation and the background operation onto the memory blocks of the memory device 150 through the regions allocated to the memory 144 of the controller 130, that is, the queues corresponding to the foreground operation and the background operation.

Herein, when the foreground operation and the background operation are performed to the memory blocks of the memory device 150, the priorities and the weights for the foreground operation and the background operation are checked, and the priorities and the weights for the queues corresponding to the foreground operation and the background operation may be decided based on the priorities and the weights for the foreground operation and the background operation, and also, the queues corresponding to the foreground operation and the background operation may be scheduled in consideration of the priorities and the weights and then allocated to the memory 144 of the controller 130. The foreground operation and the background operation performed to the memory blocks of the memory device 150 through the queues allocated to the memory 144 of the controller 130 are described in detail earlier by referring to FIGS. 5 to 8, further description on them is omitted herein. Hereafter, a data processing system and electronic devices to which the memory system 110 including the memory device 150 and the controller 130 described in accordance with the embodiment of the present invention by referring to FIGS. 1 to 9 is applied will be described in detail below with reference to FIGS. 10 to 18.

Figure 10:
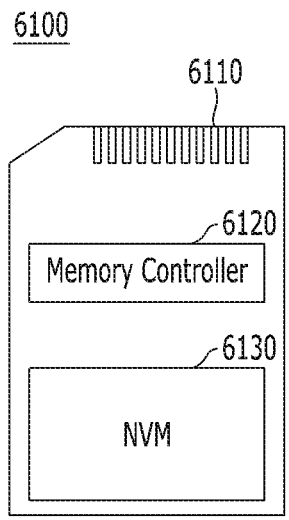
FIGS. 10 to 18 are diagrams schematically illustrating application examples of the data processing system, in accordance with various embodiments of the present invention.

FIG. 10 is a diagram schematically illustrating another example of the data processing system including the memory system in accordance with the present embodiment. FIG. 9 schematically illustrates a memory card system to which the memory system in accordance with the present embodiment is applied.

Referring to FIG. 10, the memory card system 6100 may include a memory controller 6120, a memory device 6130 and a connector 6110.

More specifically, the memory controller 6120 may be connected to the memory device 6130 embodied by a nonvolatile memory, and configured to access the memory device 6130. For example, the memory controller 6120 may be configured to control read, write, erase and background operations of the memory device 6130. The memory controller 6120 may be configured to provide an interface between the memory device 6130 and a host, and drive firmware for controlling the memory device 6130. That is, the memory controller 6120 may correspond to the controller 130 of the memory system 110 described with reference to FIG. 1, and the memory device 6130 may correspond to the memory device 150 of the memory system 110 described with reference to FIG. 1.

Thus, the memory controller 6120 may include a RAM, a processing unit, a host interface, a memory interface and an error correction unit.

The memory controller 6120 may communicate with an external device, for example, the host 102 of FIG. 1 through the connector 6110. For example, as described with reference to FIG. 1, the memory controller 6120 may be configured to communicate with an external device through one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), WIFI and Bluetooth. Thus, the memory system and the data processing system in accordance with the present embodiment may be applied to wired/wireless electronic devices or particularly mobile electronic devices.

The memory device 6130 may be implemented as a nonvolatile memory. For example, the memory device 6130 may be implemented as various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM).

The memory controller 6120 and the memory device 6130 may be integrated into a single semiconductor device. For example, the memory controller 6120 and the memory device 6130 may construct a solid-state driver (SSD) by being integrated into a single semiconductor device. Also, the memory controller 6120 and the memory device 6130 may construct a memory card such as a PC card (PCMCIA: Personal Computer Memory Card International Association), a compact flash (CF) card, a smart media card (e.g., SM and SMC), a memory stick, a multimedia card (e.g., MMC, RS-MMC, MMCmicro and eMMC), an SD card (e.g., SD, miniSD, microSD and SDHC) and a universal flash storage (UFS).

Figure 11:
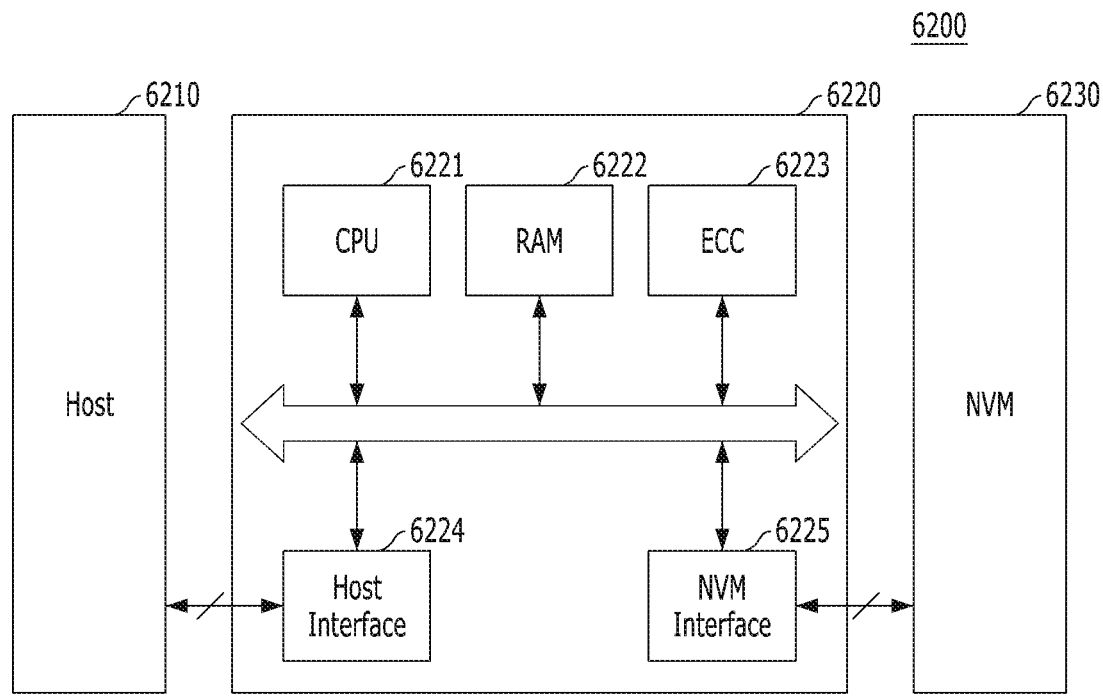

FIG. 11 is a diagram schematically illustrating another example of the data processing system including the memory system in accordance with the present embodiment.

Referring to FIG. 11, the data processing system 6200 may include a memory device 6230 having one or more nonvolatile memories and a memory controller 6220 for controlling the memory device 6230. The data processing system 6200 illustrated in FIG. 11 may serve as a storage medium such as a memory card (CF, SD, micro-SD or the like) or USB device, as described with reference to FIG. 1. The memory device 6230 may correspond to the memory device 150 in the memory system 110 illustrated in FIG. 1, and the memory controller 6220 may correspond to the controller 130 in the memory system 110 illustrated in FIG. 1.

The memory controller 6220 may control a read, write or erase operation on the memory device 6230 in response to a request of the host 6210, and the memory controller 6220 may include one or more CPUs 6221, a buffer memory such as RAM 6222, an ECC circuit 6223, a host interface 6224 and a memory interface such as an NVM interface 6225.

The CPU 6221 may control overall operations on the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the low-speed memory device 6230 to operate at high speed.

The ECC circuit 6223 may correspond to the ECC unit 138 of the controller 130 illustrated in FIG. 1. As described with reference to FIG. 1, the ECC circuit 6223 may generate an ECC (Error Correction Code) for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding the data outputted from the memory device 6230. At this time, the ECC circuit 6223 may correct an error using the parity bit. For example, as described with reference to FIG. 1, the ECC circuit 6223 may correct an error using the LDPC code, BCH code, turbo code, Reed-Solomon code, convolution code, RSC or coded modulation such as TCM or BCM.

The memory controller 6220 may transmit/receive data to/from the host 6210 through the host interface 6224, and transmit/receive data to/from the memory device 6230 through the NVM interface 6225. The host interface 6224 may be connected to the host 6210 through a PATA bus, SATA bus, SCSI, USB, PCIe or NAND interface. The memory controller 6220 may have a wireless communication function with a mobile communication protocol such as WiFi or Long-Term Evolution (LTE). The memory controller 6220 may be connected to an external device, for example, the host 6210 or another external device, and then transmit/receive data to/from the external device. In particular, as the memory controller 6220 is configured to communicate with the external device through one or more of various communication protocols, the memory system and the data processing system in accordance with the present embodiment may be applied to wired/wireless electronic devices or particularly a mobile electronic device.

Figure 12:
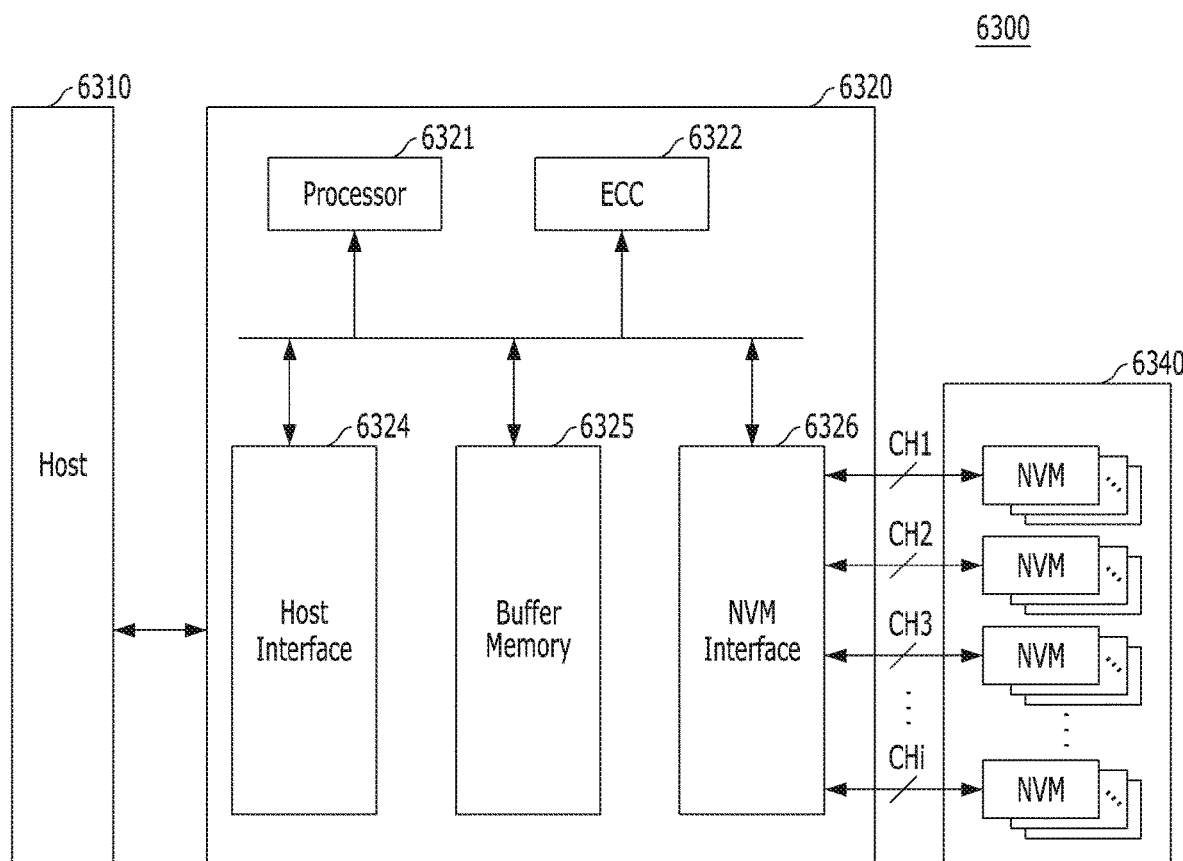

FIG. 12 is a diagram schematically illustrating another example of the data processing system including the memory system in accordance with the present embodiment. FIG. 12 schematically illustrates an SSD to which the memory system in accordance with the present embodiment is applied.

Referring to FIG. 12, the SSD 6300 may include a controller 6320 and a memory device 6340 including a plurality of nonvolatile memories. The controller 6320 may correspond to the controller 130 in the memory system 110 of FIG. 1, and the memory device 6340 may correspond to the memory device 150 in the memory system of FIG. 1

More specifically, the controller 6320 may be connected to the memory device 6340 through a plurality of channels CH1 to CHi. The controller 6320 may include one or more processors 6321, a buffer memory 6325, an ECC circuit 6322, a host interface 6324 and a memory interface, for example, a nonvolatile memory interface 6326.

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may be embodied by volatile memories such as DRAM, SDRAM, DDR SDRAM, LPDDR SDRAM and GRAM or nonvolatile memories such as FRAM, ReRAM, STT-MRAM and PRAM. For convenience of description, FIG. 8 illustrates that the buffer memory 6325 exists in the controller 6320. However, the buffer memory 6325 may exist outside the controller 6320.

The ECC circuit 6322 may calculate an ECC value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIG. 1 is applied may be provided to embody a data processing system, for example, RAID (Redundant Array of Independent Disks) system. At this time, the RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300, and output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

Figure 13:
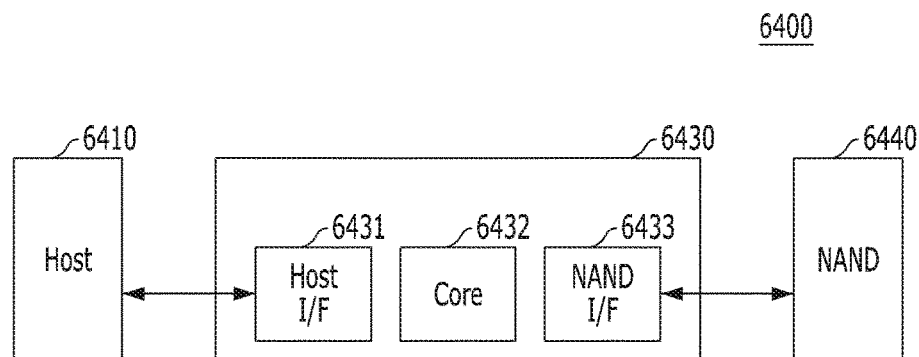

FIG. 13 is a diagram schematically illustrating another example of the data processing system including the memory system in accordance with the present embodiment. FIG. 13 schematically illustrates an embedded Multi-Media Card (eMMC) to which the memory system in accordance with the present embodiment is applied.

Referring to FIG. 13, the eMMC 6400 may include a controller 6430 and a memory device 6440 embodied by one or more NAND flash memories. The controller 6430 may correspond to the controller 130 in the memory system 110 of FIG. 1, and the memory device 6440 may correspond to the memory device 150 in the memory system 110 of FIG. 1.

More specifically, the controller 6430 may be connected to the memory device 6440 through a plurality of channels. The controller 6430 may include one or more cores 6432, a host interface 6431 and a memory interface, for example, a NAND interface 6433.

The core 6432 may control overall operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, UHS ((Ultra High Speed)-I/UHS-II) interface.

FIGS. 14 to 17 are diagrams schematically illustrating other examples of the data processing system including the memory system in accordance with the present embodiment. FIGS. 13 to 16 schematically illustrate UFS (Universal Flash Storage) systems to which the memory system in accordance with the present embodiment is applied.

Referring to FIGS. 14 to 17, the UFS systems 6500, 6600, 6700 and 6800 may include hosts 6510, 6610, 6710 and 6810, UFS devices 6520, 6620, 6720 and 6820 and UFS cards 6530, 6630, 6730 and 6830, respectively. The hosts 6510, 6610, 6710 and 6810 may serve as application processors of wired/wireless electronic devices or particularly mobile electronic devices, the UFS devices 6520, 6620, 6720 and 6820 may serve as embedded UFS devices, and the UFS cards 6530, 6630, 6730 and 6830 may serve as external embedded UFS devices or removable UFS cards.

The hosts 6510, 6610, 6710 and 6810, the UFS devices 6520, 6620, 6720 and 6820 and the UFS cards 6530, 6630, 6730 and 6830 in the respective UFS systems 6500, 6600, 6700 and 6800 may communicate with external devices, for example, wired/wireless electronic devices or particularly mobile electronic devices through UFS protocols, and the UFS devices 6520, 6620, 6720 and 6820 and the UFS cards 6530, 6630, 6730 and 6830 may be embodied by the memory system 110 illustrated in FIG. 1. For example, in the UFS systems 6500, 6600, 6700 and 6800, the UFS devices 6520, 6620, 6720 and 6820 may be embodied in the form of the data processing system 6200, the SSD 6300 or the eMMC 6400 described with reference to FIGS. 11 to 13, and the UFS cards 6530, 6630, 6730 and 6830 may be embodied in the form of the memory card system 6100 described with reference to FIG. 10.

Furthermore, in the UFS systems 6500, 6600, 6700 and 6800, the hosts 6510, 6610, 6710 and 6810, the UFS devices 6520, 6620, 6720 and 6820 and the UFS cards 6530, 6630, 6730 and 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720 and 6820 and the UFS cards 6530, 6630, 6730 and 6830 may communicate with each other through various protocols other than the UFS protocol, for example, UFDs, MMC, SD, mini-SD, and micro-SD.

Figure 14:
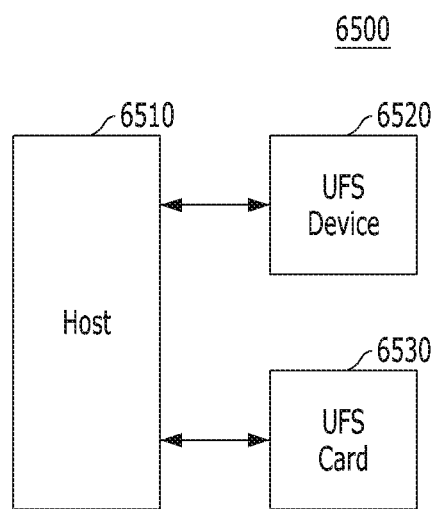

In the UFS system 6500 illustrated in FIG. 14, each of the host 6510, the UFS device 6520 and the UFS card 6530 may include UniPro. The host 6510 may perform a switching operation in order to communicate with the UFS device 6520 and the UFS card 6530. In particular, the host 6510 may communicate with the UFS device 6520 or the UFS card 6530 through link layer switching, for example, L3 switching at the UniPro. At this time, the UFS device 6520 and the UFS card 6530 may communicate with each other through link layer switching at the UniPro of the host 6510. In the present embodiment, the configuration in which one UFS device 6520 and one UFS card 6530 are connected to the host 6510 has been exemplified for convenience of description. However, a plurality of UFS devices and UFS cards may be connected in parallel or in the form of a star to the host 6410, and a plurality of UFS cards may be connected in parallel or in the form of a star to the UFS device 6520 or connected in series or in the form of a chain to the UFS device 6520.

Figure 15:
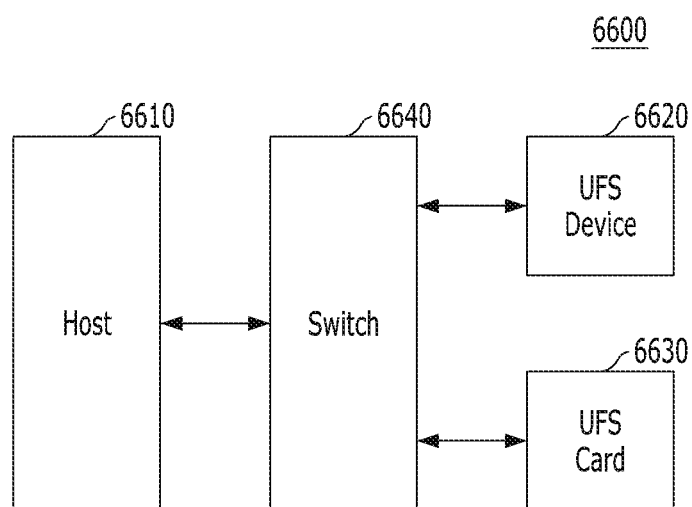

In the UFS system 6600 illustrated in FIG. 15, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In the present embodiment, the configuration in which one UFS device 6620 and one UFS card 6630 are connected to the switching module 6640 has been exemplified for convenience of description. However, a plurality of UFS devices and UFS cards may be connected in parallel or in the form of a star to the switching module 6640, and a plurality of UFS cards may be connected in series or in the form of a chain to the UFS device 6620.

Figure 16:
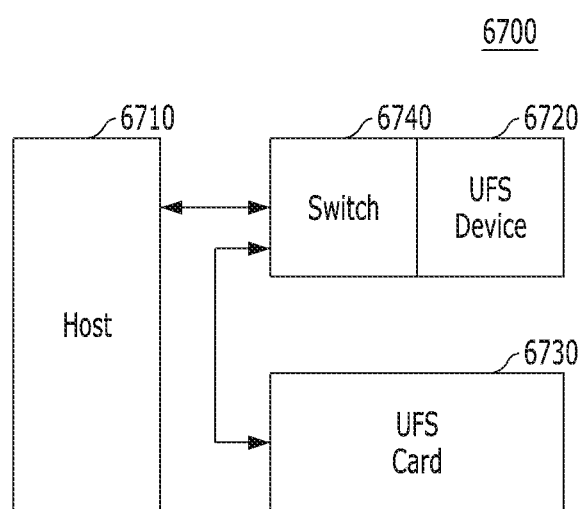

In the UFS system 6700 illustrated in FIG. 16, each of the host 6710, the UFS device 6720 and the UFS card 6730 may include UniPro, and the host 6710 may communicate with the UFS device 6720 or the UFS card 6730 through a switching module 6740 performing a switching operation, for example, through the switching module 6740 which performs link layer switching at the UniPro, for example, L3 switching. At this time, the UFS device 6720 and the UFS card 6730 may communicate with each other through link layer switching of the switching module 6740 at the UniPro, and the switching module 6740 may be integrated as one module with the UFS device 6720 inside or outside the UFS device 6720. In the present embodiment, the configuration in which one UFS device 6720 and one UFS card 6730 are connected to the switching module 6740 has been exemplified for convenience of description. However, a plurality of modules each including the switching module 6740 and the UFS device 6720 may be connected in parallel or in the form of a star to the host 6710 or connected in series or in the form of a chain to each other. Furthermore, a plurality of UFS cards may be connected in parallel or in the form of a star to the UFS device 6720.

Figure 17:
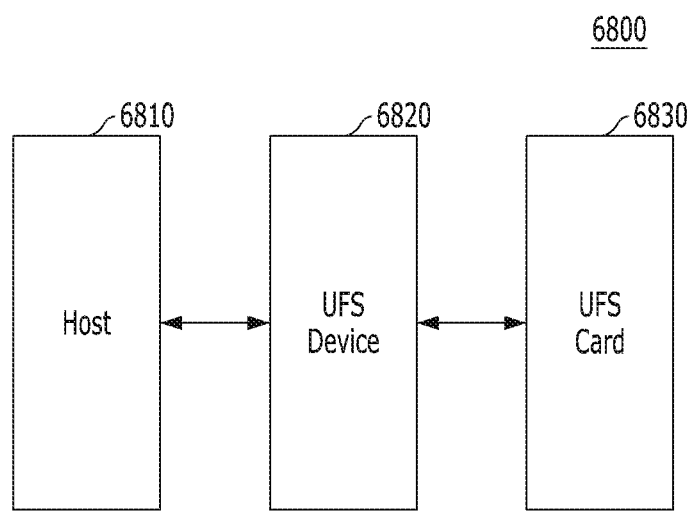

In the UFS system 6800 illustrated in FIG. 17, each of the host 6810, the UFS device 6820 and the UFS card 6830 may include M-PHY and UniPro. The UFS device 6820 may perform a switching operation in order to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target ID (Identifier) switching operation. At this time, the host 6810 and the UFS card 6830 may communicate with each other through target ID switching between the M-PHY and UniPro modules of the UFS device 6820. In the present embodiment, the configuration in which one UFS device 6820 is connected to the host 6810 and one UFS card 6830 is connected to the UFS device 6820 has been exemplified for convenience of description. However, a plurality of UFS devices may be connected in parallel or in the form of a star to the host 6810, or connected in series or in the form of a chain to the host 6810, and a plurality of UFS cards may be connected in parallel or in the form of a star to the UFS device 6820, or connected in series or in the form of a chain to the UFS device 6820.

Figure 18:
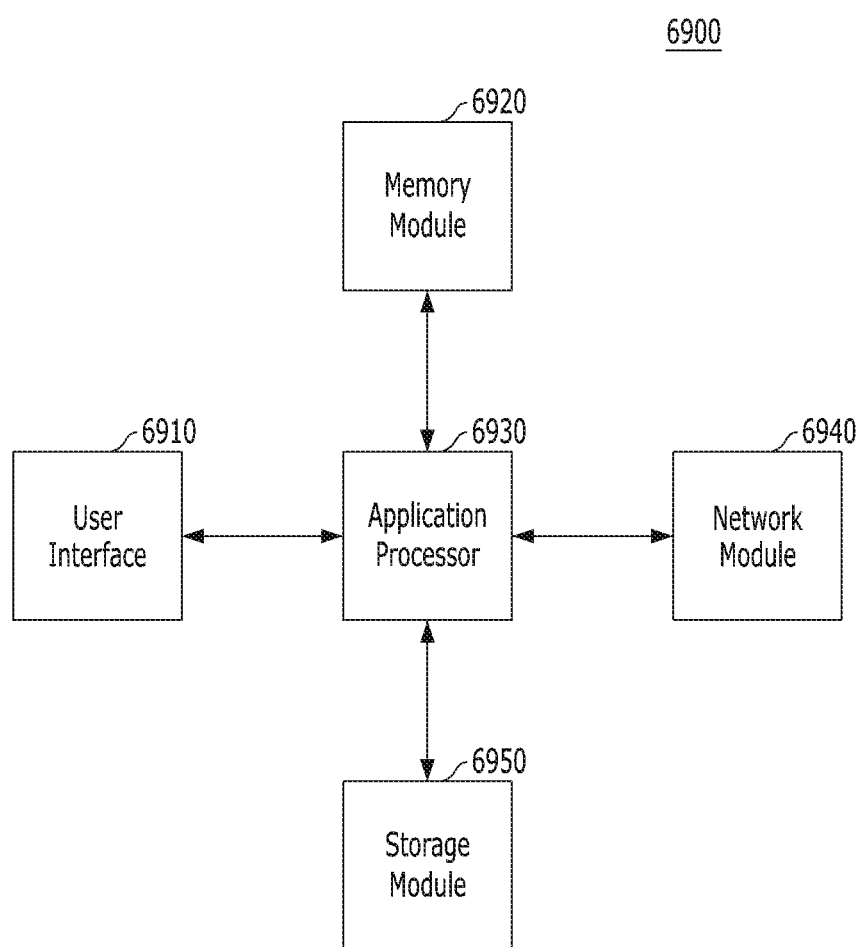

FIG. 18 is a diagram schematically illustrating another example of the data processing system including the memory system in accordance with an embodiment. FIG. 18 is a diagram schematically illustrating a user system to which the memory system in accordance with the present embodiment is applied.

Referring to FIG. 18, the user system 6900 may include an application processor 6930, a memory module 6920, a network module 6940, a storage module 6950 and a user interface 6910.

More specifically, the application processor 6930 may drive components included in the user system 6900, for example, an OS, and include controllers, interfaces and a graphic engine which control the components included in the user system 6900. The application processor 6930 may be provided as System-on-Chip (SoC).

The memory module 6920 may be used as a main memory, work memory, buffer memory or cache memory of the user system 6900. The memory module 6920 may include a volatile RAM such as DRAM, SDRAM, DDR SDRAM, DDR2 SDRAM, DDR3 SDRAM, LPDDR SDARM, LPDDR3 SDRAM or LPDDR3 SDRAM or a nonvolatile RAM such as PRAM, ReRAM, MRAM or FRAM. For example, the application processor 6930 and the memory module 6920 may be packaged and mounted, based on POP (Package on Package).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices or particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, NOR flash and 3D NAND flash, and provided as a removable storage medium such as a memory card or external drive of the user system 6900. The storage module 6950 may correspond to the memory system 110 described with reference to FIG. 1. Furthermore, the storage module 6950 may be embodied as an SSD, eMMC and UFS as described above with reference to FIGS. 12 to 17.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIG. 1 is applied to a mobile electronic device of the user system 6900, the application processor 6930 may control overall operations of the mobile electronic device, and the network module 6940 may serve as a communication module for controlling wired/wireless communication with an external device. The user interface 6910 may display data processed by the processor 6930 on a display/touch module of the mobile electronic device, or support a function of receiving data from the touch panel.

According to the embodiments of the present invention, the memory system and a method for operating the memory system may be capable of processing data with a memory device rapidly and stably by minimizing the complexity and performance deterioration of the memory system and maximizing the utility efficiency of the memory device.

While the present invention has been described with respect to the specific embodiments, it will be apparent to those skilled in the art that various changes and modifications may be made without departing from the spirit and scope of the invention as defined in the following claims.

What is claimed is:

1. A memory system, comprising:
    a memory device that includes a plurality of memory blocks each of which includes a plurality of pages for storing data; and
    a controller that includes a first memory,
    wherein the controller organizes a foreground operation and a background operation on the memory blocks by checking priorities and weights for the foreground operation and the background operation,
    wherein the weights include a basic weight, a dynamic weight, and an accumulated weight,
    wherein the controller schedules queues corresponding to the foreground operation and the background operation based on the priorities and the weights, when the accumulated weight is greater than the accumulated threshold value, the controller normalizes the dynamic weight by the accumulated weight and schedules the queues by the normalized weight,
    wherein the controller allocates regions corresponding to the scheduled queues to the first memory, and
    wherein the controller performs the foreground operation and the background operation through the regions allocated to the first memory.

2. The memory system of claim 1, wherein the priorities are decided based on at least one between importance and reliability of the foreground operation and the background operation, and importance and reliability of data corresponding to the foreground operation and the background operation.

3. The memory system of claim 1, wherein the basic weight includes the number of frequencies and an operation rate at which the foreground operation and the background operation are performed.

4. The memory system of claim 1, wherein the controller decides the dynamic weight through a calculation based on the size of the data corresponding to the foreground operation and the background operation, and the basic weight or the priorities.

5. The memory system of claim 4, wherein the controller selects first memory blocks based on parameters for the memory blocks, and decides the dynamic weight based on at least one among the number of the first memory blocks, the number of valid pages included in the first memory blocks, and the size of valid data stored in the first memory blocks.

6. The memory system of claim 1, wherein the controller decides the accumulated weight based on accumulation of the basic weight corresponding to performance of the foreground operation and the background operation.

7. The memory system of claim 1, wherein the controller schedules the queues corresponding to the foreground operation and the background operation in descending order of priorities and weights.

8. The memory system of claim 1, wherein the controller registers the priorities and the weights in a table for each index of the queues corresponding to the foreground operation and the background operation, and checks the priorities and the weights from the table.

9. The memory system of claim 1,
    wherein the controller determines fixed priorities to first queues and determines dynamic priorities to second queues among the queues corresponding to the foreground operation and the background operation, and
    wherein the fixed priorities have higher priority than the dynamic priorities.

10. The memory system of claim 1, wherein the controller schedules queues corresponding to the foreground operation and the background operation based on the priorities and the weights, further includes when the accumulated weight is less than or equal to an accumulated threshold value, the controller sequentially schedules the queues by the dynamic weight.

11. A method for operating a memory system, comprising:
    organizing a foreground operation and a background operation to a memory device which includes a plurality of memory blocks each of which includes a plurality of pages for storing data;
    checking priorities and weights for the foreground operation and the background operation, wherein the weights include a basic weight, a dynamic weight, and an accumulated weight;
    scheduling queues corresponding to the foreground operation and the background operation based on the priorities and the weights, when the accumulated weight is greater than the accumulated threshold value, normalizing the dynamic weight by the accumulated weight and scheduling the queues by the normalized weight;
    allocating regions corresponding to the scheduled queues to the first memory included in a controller of the memory device; and
    performing the foreground operation and the background operation through the regions allocated to the first memory.

12. The method of claim 11, wherein the priorities are decided based on at least one between importance and reliability of the foreground operation and the background operation and importance and reliability of data corresponding to the foreground operation and the background operation.

13. The method of claim 11, wherein the basic weight includes the number of frequencies and an operation rate at which the foreground operation and the background operation are performed.

14. The method of claim 11, further comprising:
    deciding the dynamic weight through a calculation of the size of the data corresponding to the foreground operation and the background operation, and the basic weight or the priorities.

15. The method of claim 14, wherein the deciding of the dynamic weight includes:
    selecting first memory blocks based on parameters for the memory blocks; and
    deciding the dynamic weight based on at least one among the number of the first memory blocks, the number of valid pages included in the first memory blocks, and the size of valid data stored in the first memory blocks.

16. The method of claim 11, further comprising: deciding the accumulated weight based on accumulation of the basic weight corresponding to performance of the foreground operation and the background operation.

17. The method of claim 11, wherein the scheduling of the queues corresponding to the foreground operation and the background operation based on the priorities and the weights includes scheduling the queues corresponding to the foreground operation and the background operation in descending order of priorities and weights.

18. The method of claim 11, wherein the checking of the priorities and the weights for the foreground operation and the background operation includes:
- registering the priorities and the weights in a table for each index of the queues corresponding to the foreground operation and the background operation; and
- checking the priorities and the weights from the table.

19. The method of claim 11,
- further comprising determining fixed priorities to first queues and determining dynamic priorities to second queues among the queues corresponding to the foreground operation and the background operation,
- wherein the fixed priorities have higher priority than the dynamic priorities.

20. The method of claim 11, wherein scheduling queues corresponding to the foreground operation and the background operation based on the priorities and the weights, further includes when the accumulated weight is less than or equal to an accumulated threshold value, the controller sequentially schedules the queues by the dynamic weight.

* * * * *